(12) United States Patent
Sandoz et al.

(10) Patent No.: US 12,371,126 B2
(45) Date of Patent: Jul. 29, 2025

(54) ADJUSTABLE BELT DRIVE ASSEMBLY, SYSTEM AND METHOD

(71) Applicant: Arctic Cat Inc., Thief River Falls, MN (US)

(72) Inventors: Samuel James Sandoz, Thief River Falls, MN (US); Jacob Tyler Crosby, Oklee, MN (US); Todd MacDonald, Balderson (CA)

(73) Assignee: Arctic Cat Inc., Thief River Falls, MN (US)

( * ) Notice: Subject to any disclaimer, the term of this patent is extended or adjusted under 35 U.S.C. 154(b) by 47 days.

(21) Appl. No.: 17/588,487

(22) Filed: Jan. 31, 2022

(65) Prior Publication Data
US 2023/0242212 A1    Aug. 3, 2023

(51) Int. Cl.
*B62M 9/16* (2006.01)
*B62M 27/02* (2006.01)

(52) U.S. Cl.
CPC .............. *B62M 9/16* (2013.01); *B62M 27/02* (2013.01)

(58) Field of Classification Search
CPC .......... B62M 9/16; B62M 27/02; F16C 23/00; F16C 23/04; F16H 7/10
USPC ................................... 474/111, 112; 384/428
See application file for complete search history.

(56) References Cited

U.S. PATENT DOCUMENTS

| | | | | |
|---|---|---|---|---|
| D371,139 S | * | 6/1996 | Waskiewicz | D15/143 |
| 5,533,585 A | * | 7/1996 | Kawano | B62M 27/02 |
| | | | | 180/9.1 |
| 5,749,659 A | * | 5/1998 | Nisley | F16C 23/00 |
| | | | | 384/247 |
| 6,042,270 A | * | 3/2000 | Meyer | F16C 23/045 |
| | | | | 384/255 |
| 7,481,206 B1 | * | 1/2009 | Carlson | F02B 39/04 |
| | | | | 474/112 |
| 7,563,185 B2 | * | 7/2009 | Naude | F16H 9/24 |
| | | | | 474/49 |

(Continued)

FOREIGN PATENT DOCUMENTS

| | | | | |
|---|---|---|---|---|
| CN | 202349130 U | * | 7/2015 | |
| DE | 102009031507 A1 | * | 1/2010 | F16H 29/04 |

(Continued)

OTHER PUBLICATIONS

EP 1,455,134 Machine Translation. (Year: 2004).*

(Continued)

*Primary Examiner* — Anna M Momper
*Assistant Examiner* — Juan J Campos, Jr.
(74) *Attorney, Agent, or Firm* — Billion & Armitage

(57) ABSTRACT

A belt housing assembly includes a first shaft with a first bearing that is mounted in a fixed bearing retainer and a second shaft with a second bearing mounted in a rotatable eccentric bearing retainer. A center of the second bearing is offset from a center of the eccentric bearing retainer. A distance between the first shaft and the second shaft is adjustable by rotating the eccentric bearing retainer. A method of adjusting a distance between a first sprocket attached to a first shaft of a drivetrain operatively interconnecting an engine to a ground engagement member of an all-terrain vehicle via a drive belt interconnected with a second sprocket attached to a second shaft of the drivetrain is also provided.

23 Claims, 32 Drawing Sheets

(56) References Cited

U.S. PATENT DOCUMENTS

| | | | | |
|---|---|---|---|---|
| 7,648,436 | B2* | 1/2010 | Horst | F16H 19/005 474/134 |
| 7,713,153 | B2* | 5/2010 | Naude | F16H 9/24 474/49 |
| 8,186,883 | B2* | 5/2012 | Nollenberger | F16C 35/00 384/477 |
| 8,561,498 | B2* | 10/2013 | Domahidy | B62M 9/16 474/112 |
| 8,596,874 | B2* | 12/2013 | Shaikh | F16C 35/04 384/537 |
| 8,919,477 | B2* | 12/2014 | Conn | B62K 19/22 180/9.62 |
| 11,162,563 | B2* | 11/2021 | Watanabe | F16H 7/0848 |
| 2002/0134633 | A1* | 9/2002 | Dahlin | F16D 13/58 192/115 |
| 2003/0054909 | A1* | 3/2003 | Flaspeter | F16H 55/56 474/8 |
| 2004/0050605 | A1* | 3/2004 | Fecteau | F16H 7/14 180/210 |
| 2004/0252928 | A1* | 12/2004 | Dittenhofer | F16C 13/02 384/583 |
| 2006/0188188 | A1* | 8/2006 | Abrahamian | F16C 17/03 384/255 |
| 2009/0014992 | A1* | 1/2009 | Matsuura | B62K 5/01 280/781 |
| 2010/0144473 | A1* | 6/2010 | Ward | F16H 7/1218 474/112 |
| 2014/0073467 | A1* | 3/2014 | Doering | F16H 7/16 474/112 |

FOREIGN PATENT DOCUMENTS

| | | | | |
|---|---|---|---|---|
| EP | 1455134 | A1 * | 9/2004 | F21S 48/1109 |
| JP | 2019002478 | A * | 1/2019 | |

OTHER PUBLICATIONS

CN 202349130 U Machine Translation (Year: 2012).*
Snowmobile Related Discussions and Riding Area's Ski-Doo Chat C3 Belt Drive System; http://www.snowandmud.com/ski-doo-chat/24846-c3-belt-drive-system-4.html; last viewed on Mar. 23, 2021.
SyncroDrive Install; C3PowerSports; https://www.youtube.com/watch?v=v5W8CAg6gak; last viewed on Mar. 23, 2021.
Allred, Matt. "How to Install Your CMX Belt Drive", American Snowmobiler, vol. 16, No. 5 Jan./Feb. 2002, 4 pages.
Allred, Matt, "Crazy Mountain Xtreme", American Snowmobiler, vol. 15, No. 2, Feb. 2002, 5 pages.

* cited by examiner

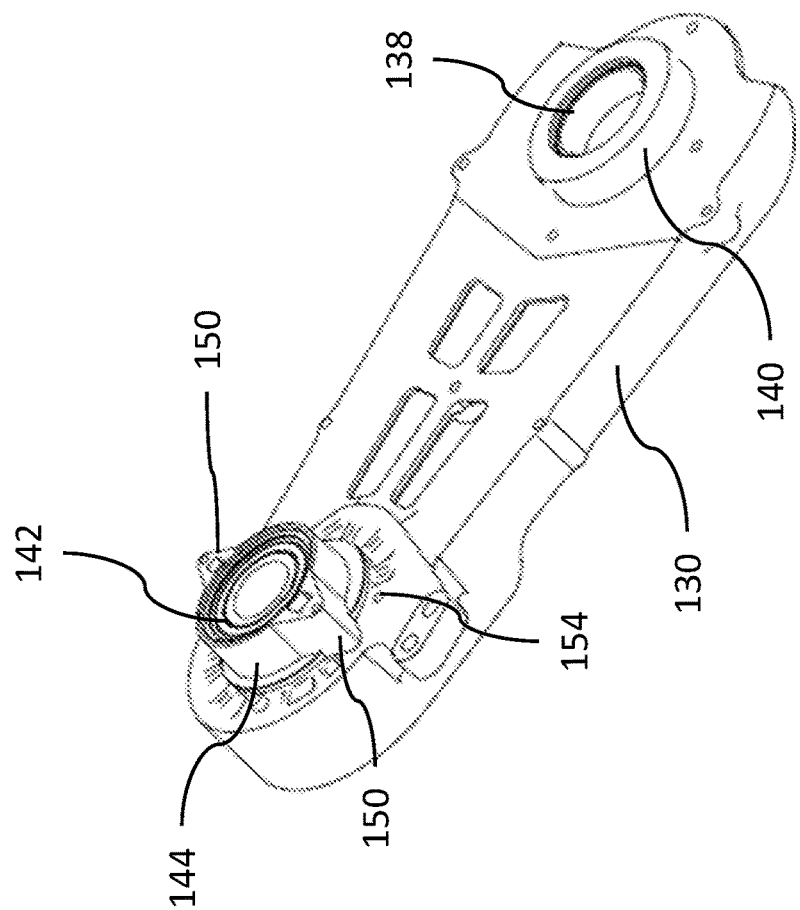
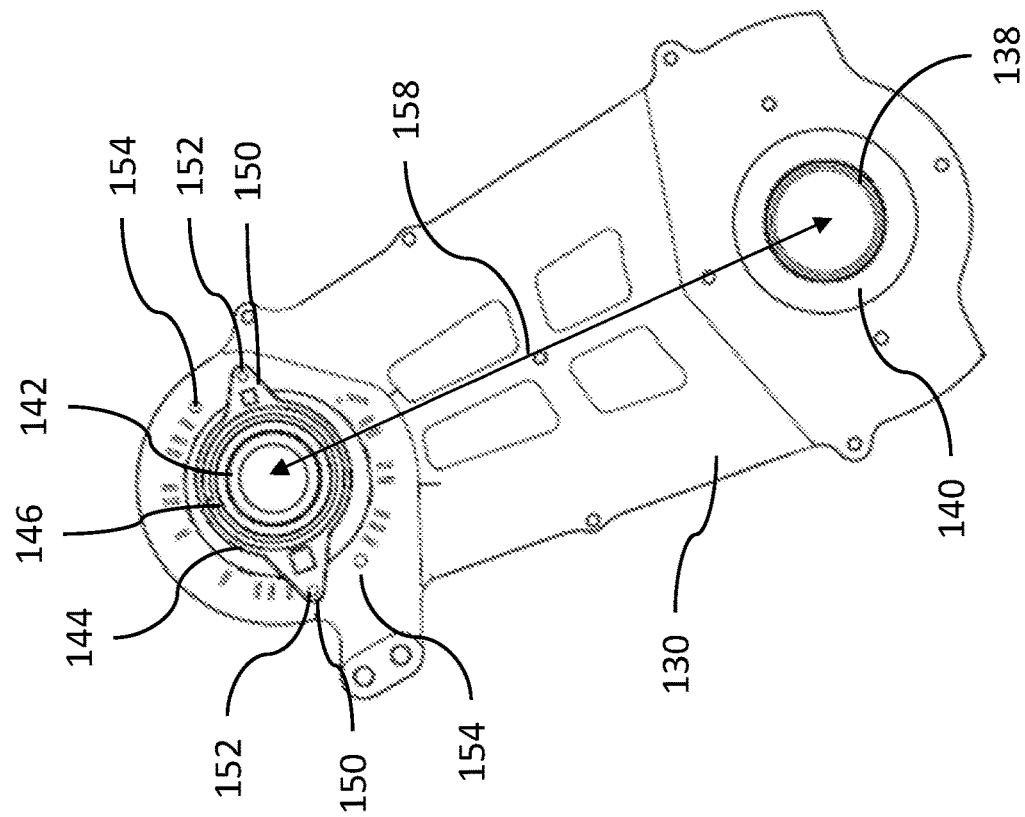
Fig. 22B
Fig. 22A

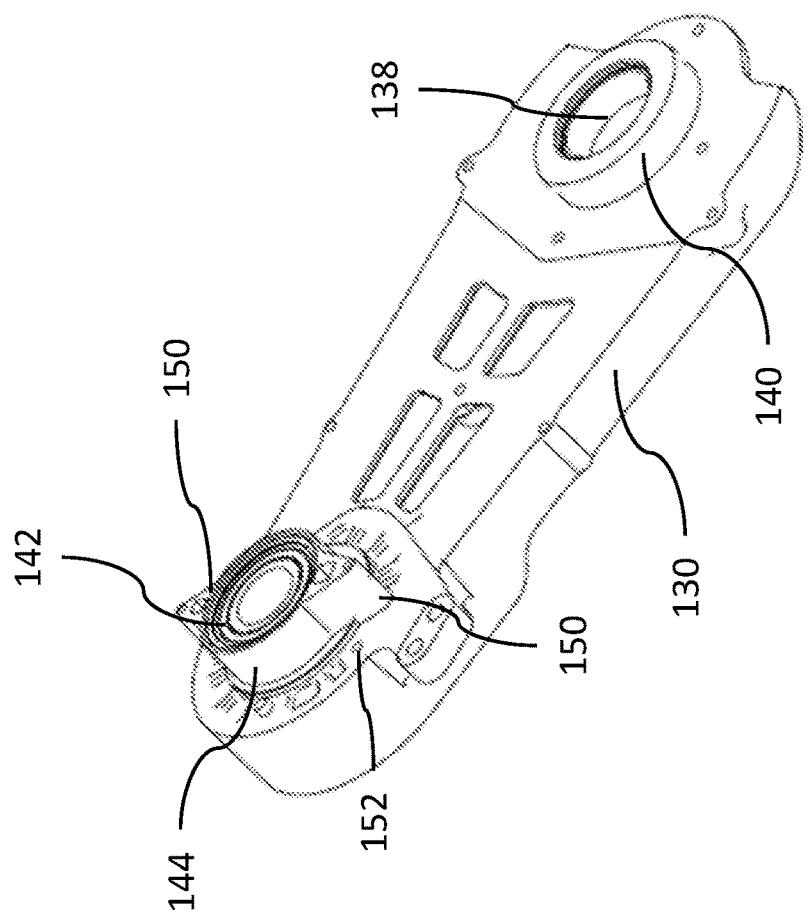
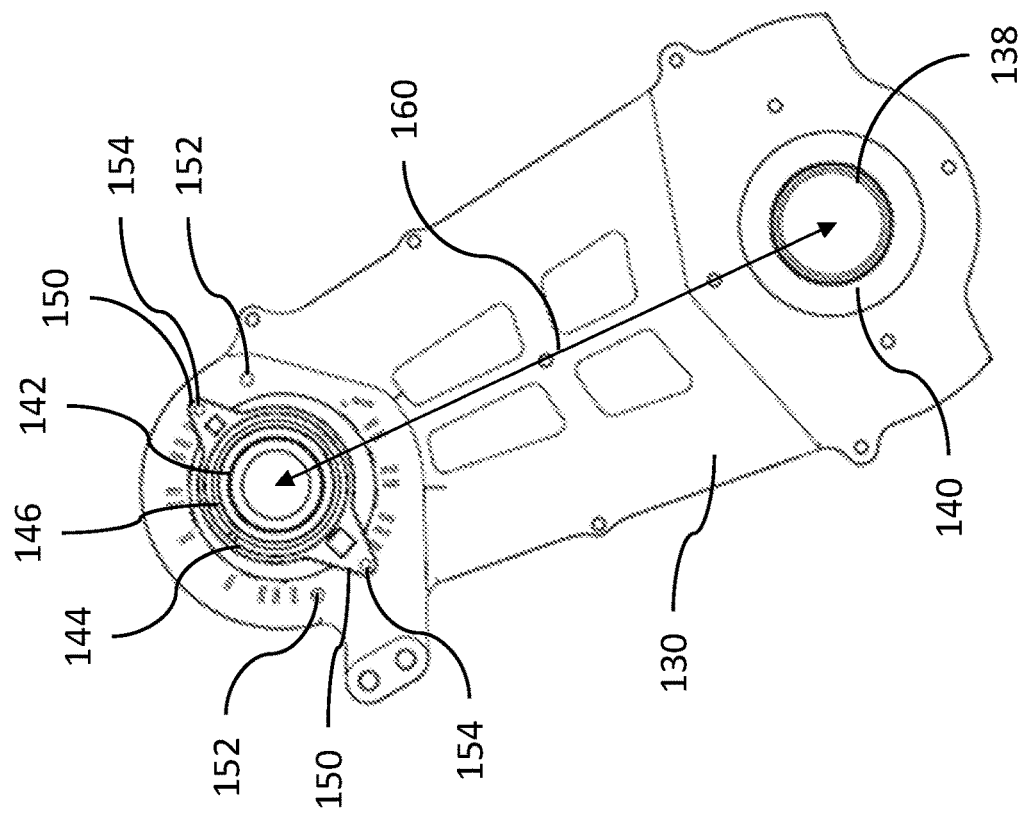
Fig. 23B
Fig. 23A

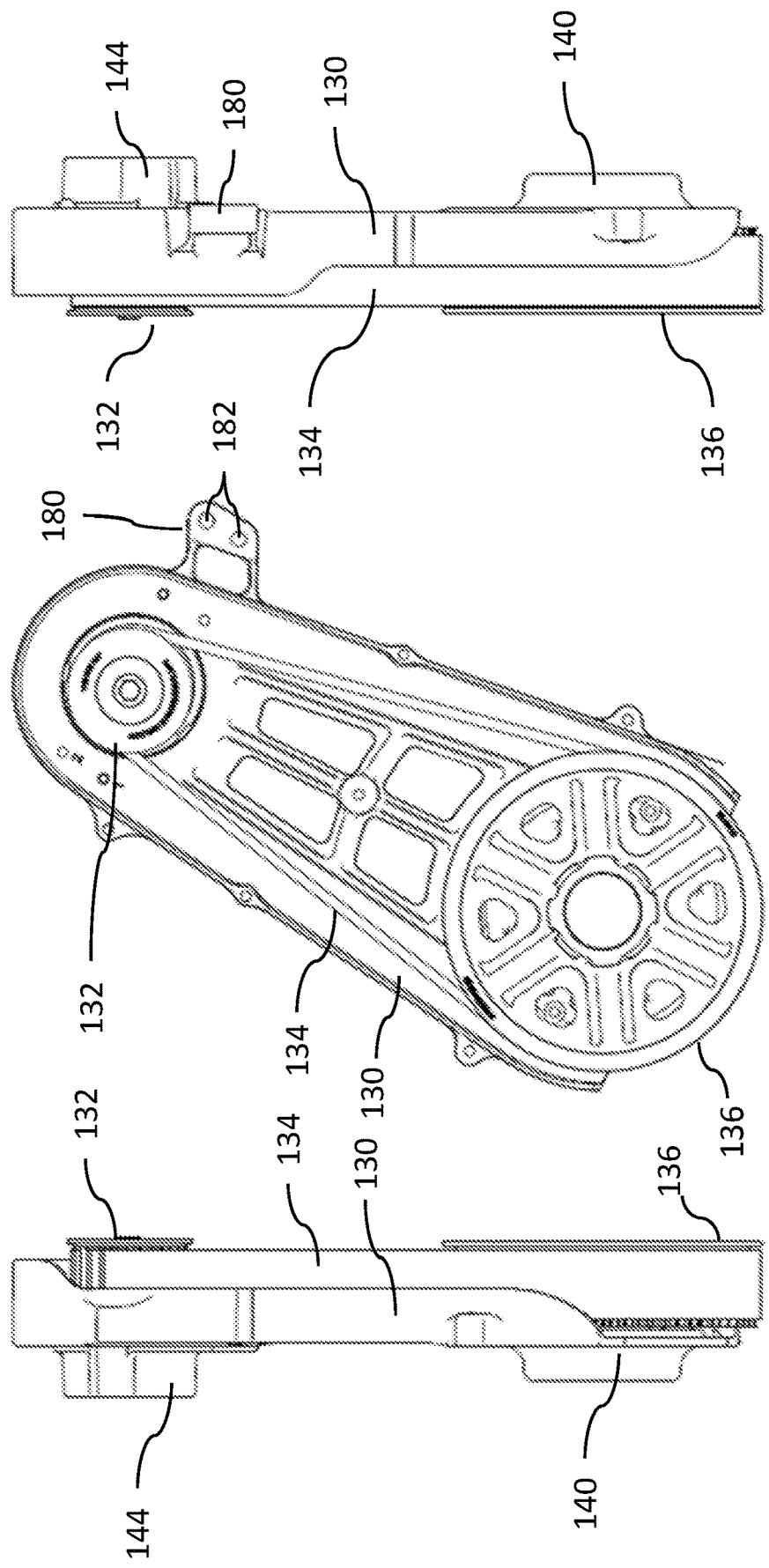

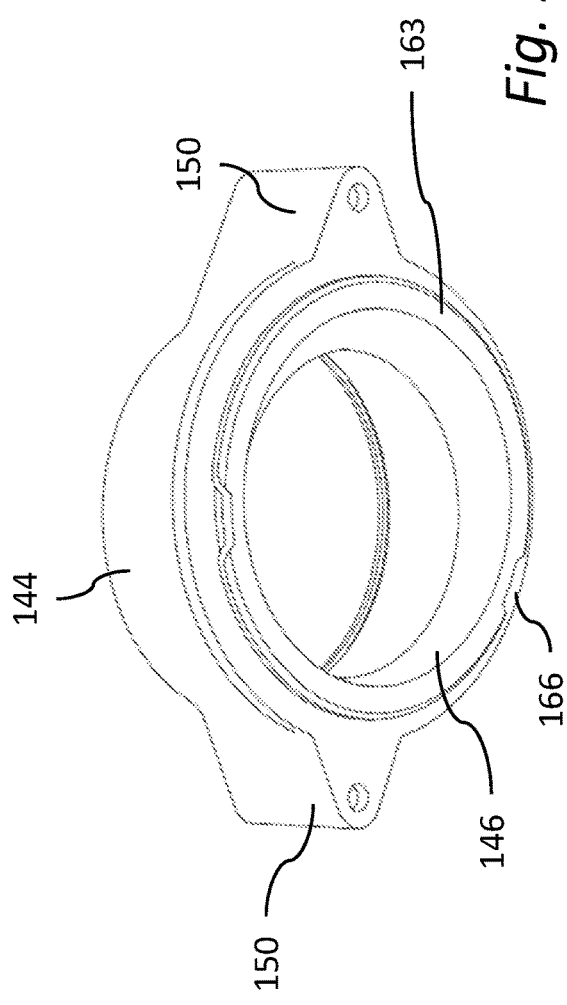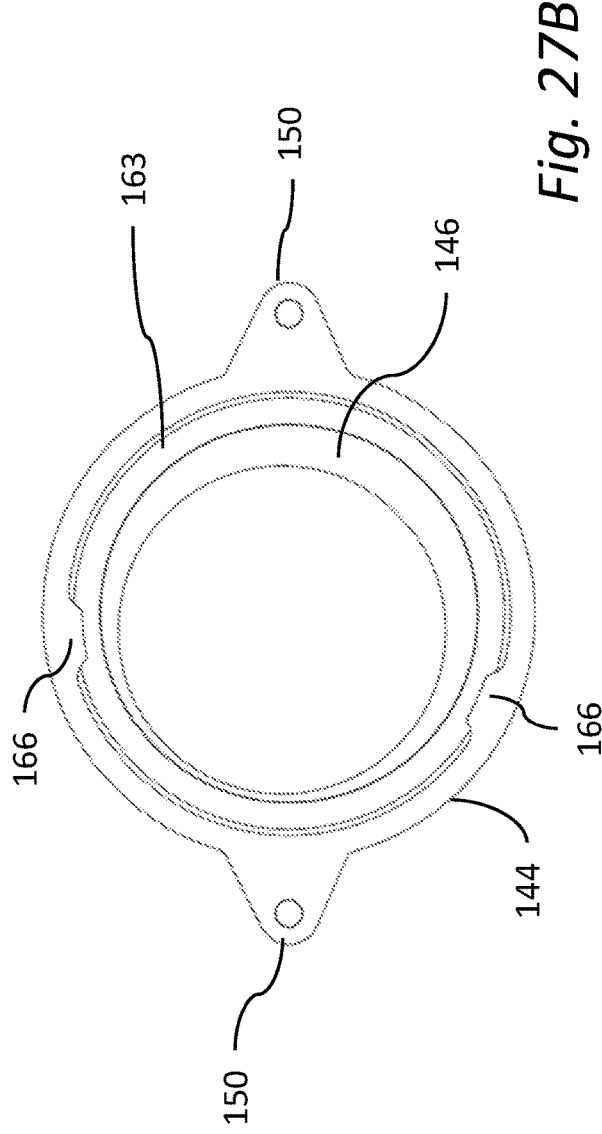

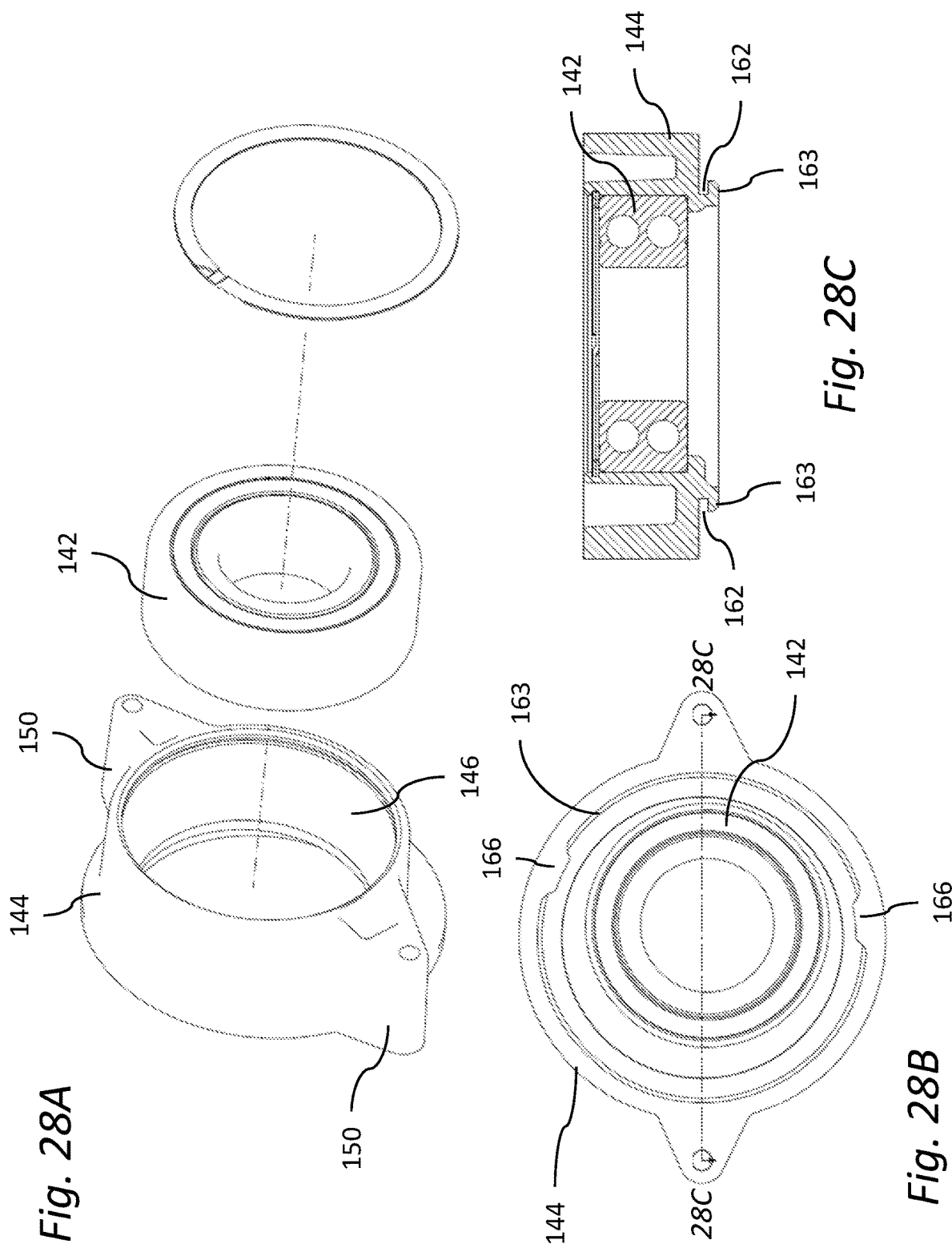

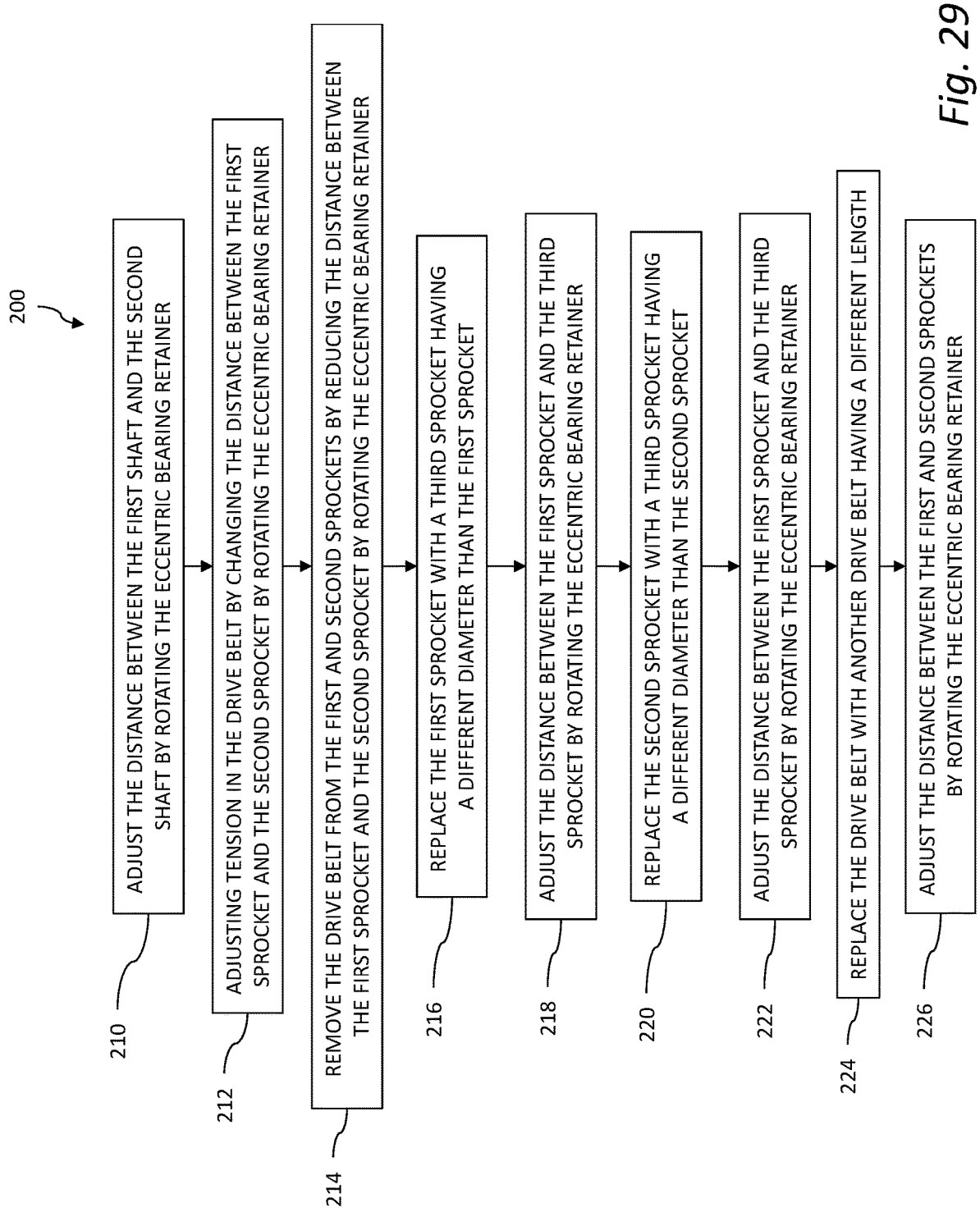

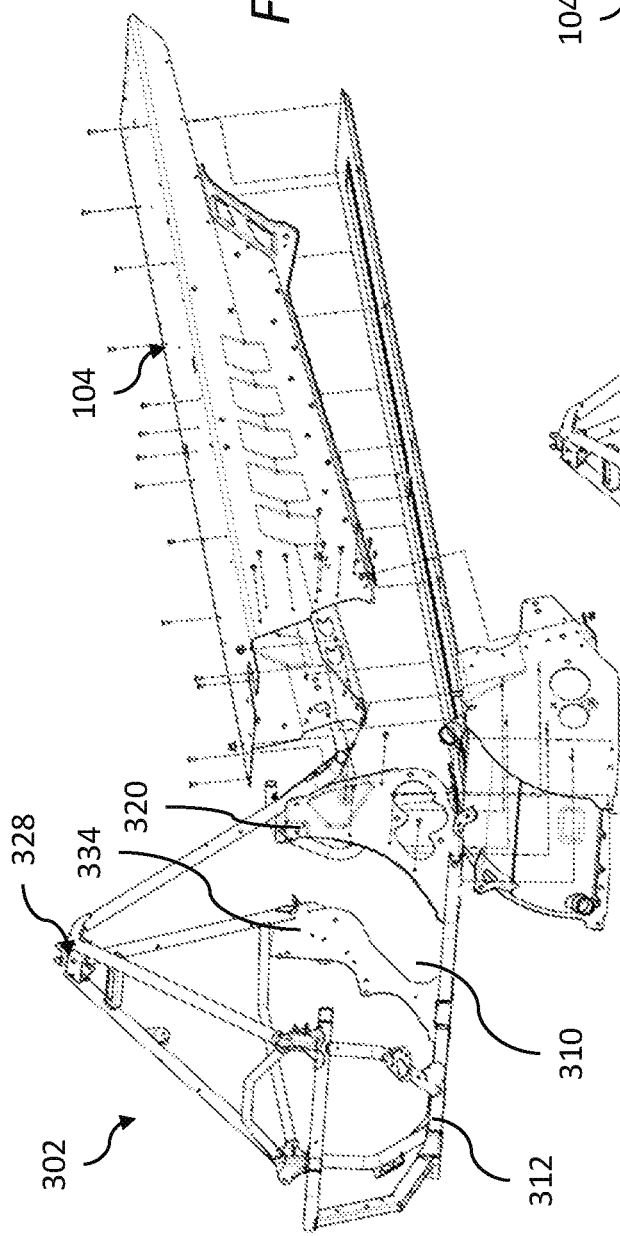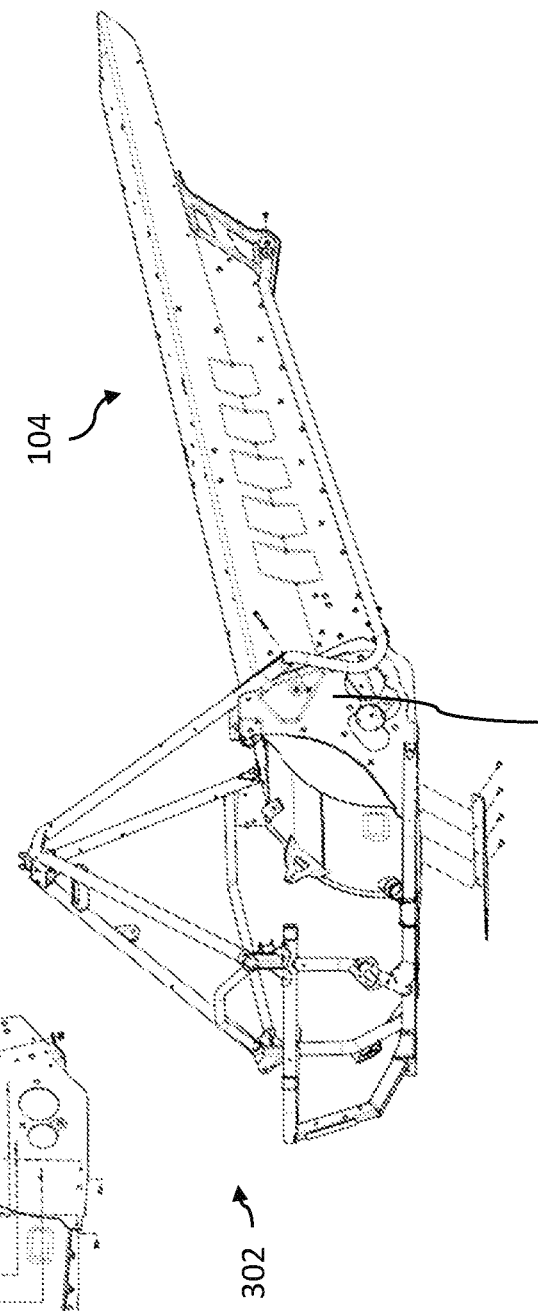

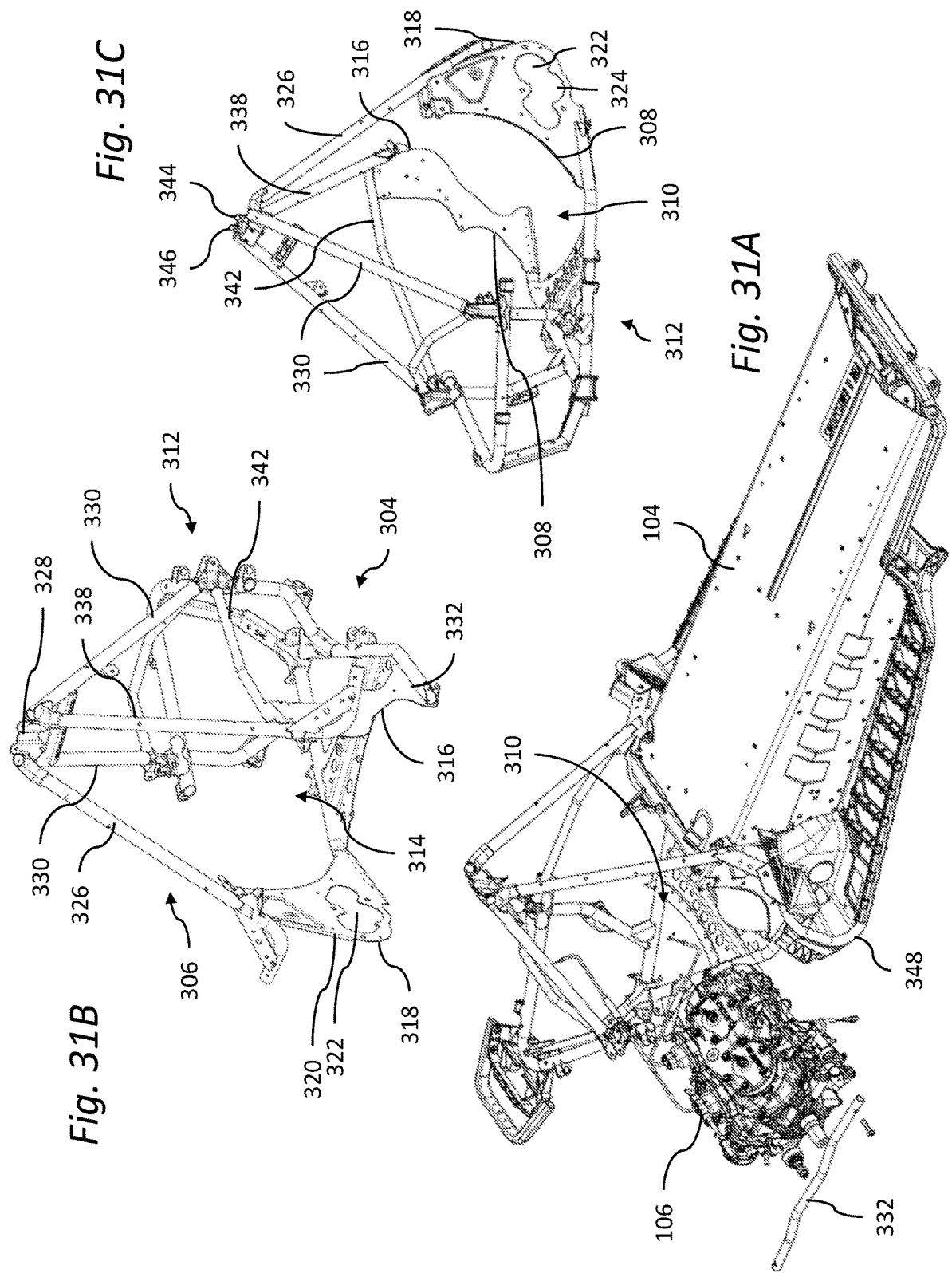

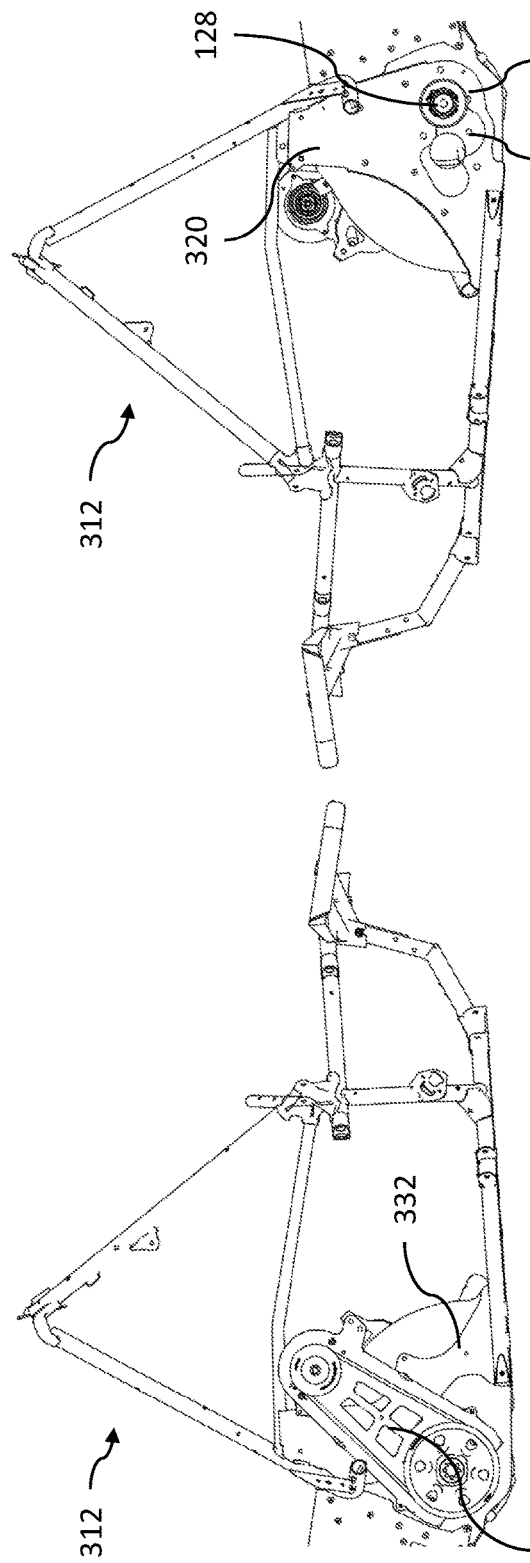
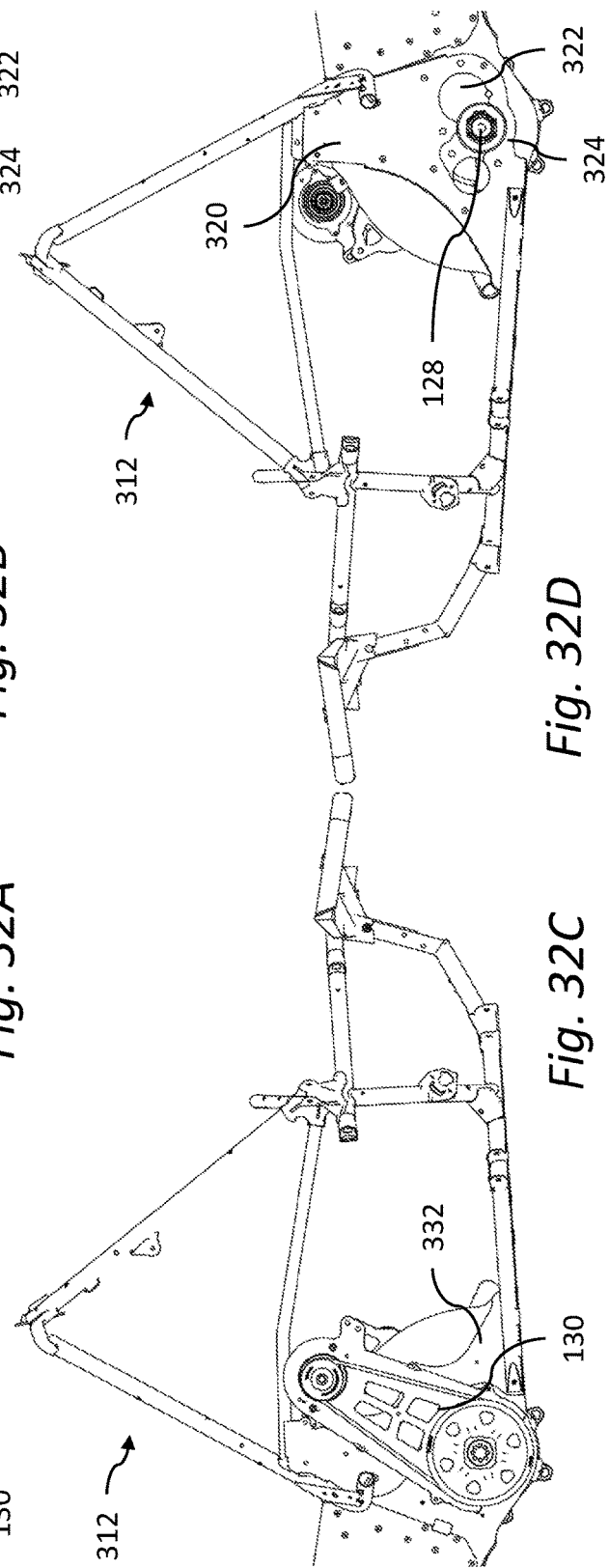
Fig. 32A
Fig. 32B
Fig. 32C
Fig. 32D

ADJUSTABLE BELT DRIVE ASSEMBLY, SYSTEM AND METHOD

BACKGROUND

All-terrain vehicles, which include snowmobiles and snow bikes, are popular land vehicles used as transportation vehicles or as recreational vehicles. Generally, all-terrain vehicles are available for various applications such as deep snow, high performance, luxury touring, and trail riding, for example. In general, an all-terrain vehicle has a chassis on or around which the various components of the all-terrain vehicle are assembled. Typical all-terrain vehicles include one or more skis or wheels for steering, a seat, handlebars, and a ground engagement member, such as an endless drive track, tires, or wheels for propulsion mounted to a central chassis. A handlebar assembly, positioned forward of the seat, is operatively linked to the skis for steering the all-terrain vehicle.

SUMMARY

According to one or more aspects of the present disclosure, an all-terrain vehicle includes a chassis, an engine or electric motor attached to the chassis, a ground engagement member, and a drivetrain operatively interconnecting the engine with the ground engagement member and configured to deliver propulsive power to the ground engagement member. The drivetrain further includes a first shaft having a first bearing disposed within a fixed bearing retainer and a second shaft having a second bearing disposed within a rotatable eccentric bearing retainer. A center of the second bearing is offset from a center of the eccentric bearing retainer. A distance between the first shaft and the second shaft is adjustable by rotating the eccentric bearing retainer.

In one or more embodiments of the all-terrain vehicle according to the previous paragraph, the all-terrain vehicle further includes a bearing housing in which the fixed bearing retainer and the eccentric bearing retainer are disposed. A first shaft axis is fixed relative to the bearing housing and a second shaft axis is movable relative to the first shaft axis and the bearing housing by rotating the eccentric bearing retainer.

In one or more embodiments of the all-terrain vehicle according to any one of the previous paragraphs, the eccentric bearing retainer defines a retainer attachment feature, and the bearing housing defines a first housing attachment feature, wherein a first distance between the first axis and the second axis is established by engagement of the retainer attachment feature with the first housing attachment feature.

In one or more embodiments of the all-terrain vehicle according to any one of the previous paragraphs, a second distance between the first axis and the second axis that is different from the first distance is established by engagement of a second retainer attachment feature with a second housing attachment feature.

In one or more embodiments of the all-terrain vehicle according to any one of the previous paragraphs, the retainer attachment feature is coaxial with and angularly offset from the second retainer attachment feature.

In one or more embodiments of the all-terrain vehicle according to any one of the previous paragraphs, the first housing attachment feature is coaxial with and angularly offset from the second housing attachment feature.

In one or more embodiments of the all-terrain vehicle according to any one of the previous paragraphs, a second distance between the first axis and the second axis different than the first distance is established by engagement of a second retainer attachment feature with a second housing attachment feature.

In one or more embodiments of the all-terrain vehicle according to any one of the previous paragraphs, the eccentric bearing retainer is rotatably attached to the bearing housing by a cylindrical grooved flange and a tab projecting from the bearing housing projecting into the grooved flange.

In one or more embodiments of the all-terrain vehicle according to any one of the previous paragraphs, the second bearing is disposed within a cylindrical bearing cavity within the eccentric bearing retainer and wherein a bearing cavity axis is offset from a grooved flange axis.

In one or more embodiments of the all-terrain vehicle according to any one of the previous paragraphs, the bearing cavity axis is coaxial with the second shaft axis.

In one or more embodiments of the all-terrain vehicle according to any one of the previous paragraphs, the first shaft has a first sprocket, and the second shaft has a second sprocket and wherein the first sprocket is interconnected to the second sprocket by a drive belt.

In one or more embodiments of the all-terrain vehicle according to any one of the previous paragraphs, a circumference around the first sprocket and second sprocket is reduced by rotating the eccentric bearing retainer, thereby allowing removal of the drive belt from the first and second sprockets.

In one or more embodiments of the all-terrain vehicle according to any one of the previous paragraphs, tension in the drive belt may be adjusted by rotating the eccentric bearing retainer.

In one or more embodiments of the all-terrain vehicle according to any one of the previous paragraphs, the first shaft receives the propulsive power from the engine and the second shaft delivers the propulsive power to the ground engagement member.

According to one or more aspects of the present disclosure, a method of adjusting a distance between a first sprocket attached to a first shaft of a drivetrain operatively interconnecting an engine to a ground engagement member of an all-terrain vehicle via a drive belt interconnected with a second sprocket attached to a second shaft of the drivetrain, wherein the first shaft has a first bearing disposed within a fixed bearing retainer and the second shaft has a second bearing disposed within an eccentric bearing retainer is provided. The method includes the step of adjusting the distance between the first shaft and the second shaft by rotating the eccentric bearing retainer In one or more embodiments of the method according to the previous paragraph, the method further includes removing the drive belt from the first and second sprockets by reducing the distance between the first sprocket and the second sprocket by rotating the eccentric bearing retainer.

In one or more embodiments of the method according to any one of the previous paragraphs, the method further includes adjusting tension in the drive belt by changing the distance between the first sprocket and the second sprocket by rotating the eccentric bearing retainer.

In one or more embodiments of the method according to any one of the previous paragraphs, the method further includes replacing the first sprocket with a third sprocket having a different diameter than the first sprocket and adjusting the distance between the second sprocket and the third sprocket by rotating the eccentric bearing retainer.

In one or more embodiments of the method according to any one of the previous paragraphs, the method further includes replacing the second sprocket with a third sprocket having a different diameter than the second sprocket and adjusting the distance between the first sprocket and the third sprocket by rotating the eccentric bearing retainer.

In one or more embodiments of the method according to any one of the previous paragraphs, the method further includes replacing the drive belt with another drive belt having a different length and adjusting the distance between the first and second third sprockets by rotating the eccentric bearing retainer.

BRIEF DESCRIPTION OF THE DRAWINGS

This written disclosure describes illustrative embodiments that are non-limiting and non-exhaustive. Reference is made to illustrative embodiments that are depicted in the figures, in which:

FIG. 22A illustrates a rear view of a shaft positioning arm and bearings of the right side of the driveline of the snowmobile with the eccentric bearing retainer in a first position, according to some embodiments;

FIG. 22B illustrates a rear perspective view of a shaft positioning arm and bearings of the right side of the driveline of the snowmobile with the eccentric bearing retainer in a first position, according to some embodiments;

FIG. 23A illustrates a rear view of a shaft positioning arm and bearings of the right side of the driveline of the snowmobile with the eccentric bearing retainer in a second position, according to some embodiments;

FIG. 23B illustrates a rear perspective view of a shaft positioning arm and bearings of the right side of the driveline of the snowmobile with the eccentric bearing retainer in a second position, according to some embodiments;

FIG. 24A illustrates a side view of the right side of the driveline of the snowmobile with the drive belt and sprockets, according to some embodiments;

FIG. 24B illustrates a front view of the right side of the driveline of the snowmobile with the drive belt and sprockets, according to some embodiments;

FIG. 24C illustrates another side view of the right side of the driveline of the snowmobile with the drive belt and sprockets, according to some embodiments;

FIG. 27A illustrates a perspective rear view of the eccentric bearing retainer of the driveline of the snowmobile, according to some embodiments;

FIG. 27B illustrates another rear view of the eccentric bearing retainer of the driveline of the snowmobile, according to some embodiments;

FIG. 28A illustrates an exploded view of the eccentric bearing retainer of the driveline of the snowmobile, according to some embodiments;

FIG. 28B illustrates yet another rear view of the eccentric bearing retainer of the driveline of the snowmobile, according to some embodiments;

FIG. 28C illustrates a cross section side view of the eccentric bearing retainer of the driveline of the snowmobile, according to some embodiments;

FIG. 29 is a flowchart for a method of adjusting a distance between a first sprocket attached to a first shaft of a drivetrain operatively interconnecting an engine to a ground engagement member of a snowmobile via a drive belt interconnected with a second sprocket attached to a second shaft of the drivetrain, wherein the first shaft has a first bearing disposed within a fixed bearing retainer and the second shaft has a second bearing disposed within an eccentric bearing retainer;

FIG. 30A illustrates a perspective view of a snowmobile subassembly, according to some embodiments;

FIG. 30B illustrates an exploded view of a snowmobile subassembly, according to some embodiments;

FIG. 31A illustrates an exploded view of a snowmobile subassembly, according to some embodiments;

FIG. 31B illustrates left front perspective view of a snowmobile frame, according to some embodiments;

FIG. 31C illustrates right rear perspective view of the snowmobile frame, according to some embodiments;

FIG. 32A illustrates a right side view of a snowmobile frame, according to some embodiments;

FIG. 32B illustrates a left side view of the snowmobile frame of FIG. 32A, according to some embodiments;

FIG. 32C illustrates a right side view of another snowmobile frame, according to some embodiments; and FIG. 32D illustrates a left side view of the snowmobile frame of FIG. 32C, according to some embodiments.

DETAILED DESCRIPTION

Figure 1:
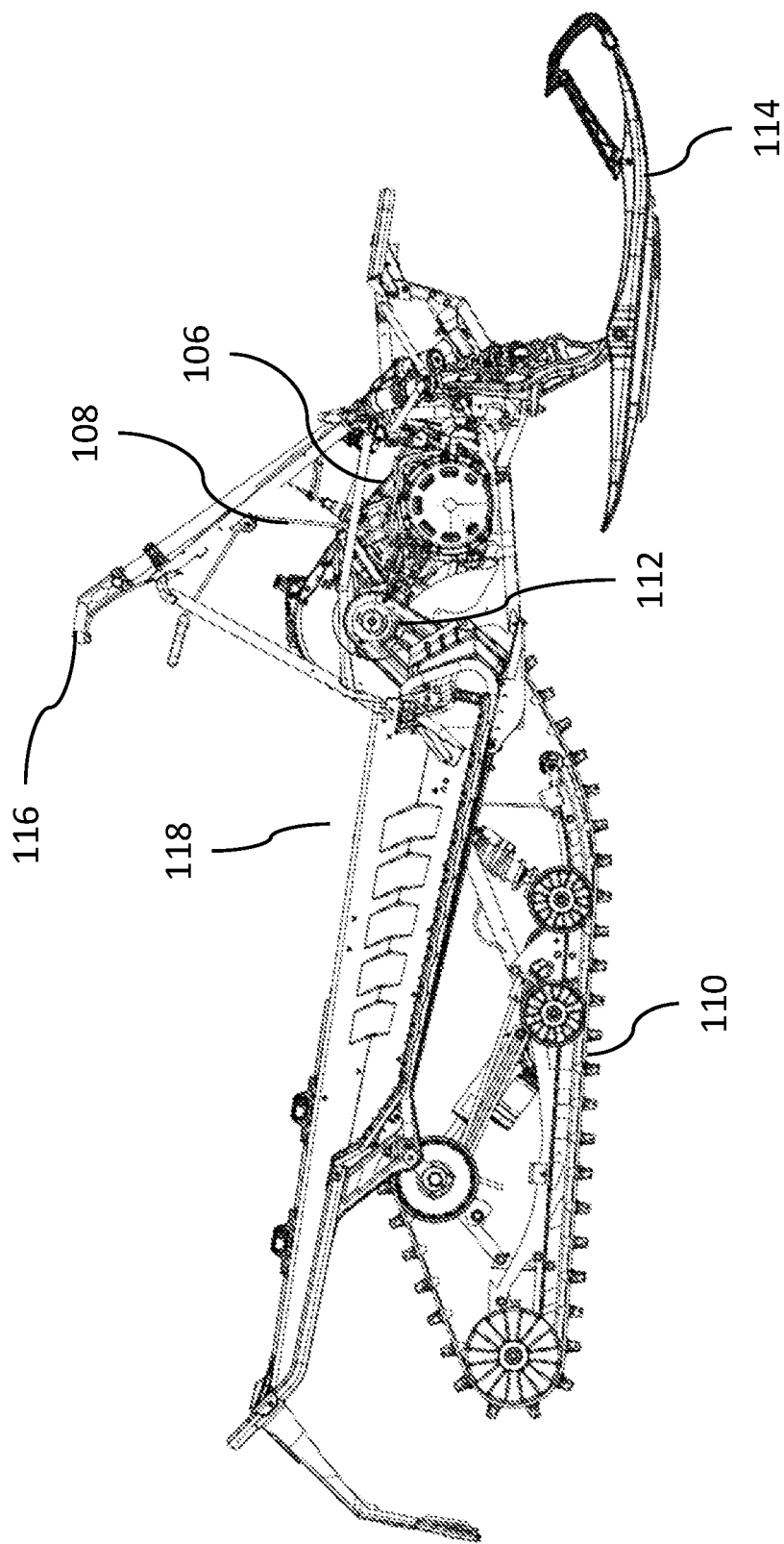
FIG. 1 illustrates a right side view of a snowmobile with portions of the engine cover removed, according to some embodiments.
Figure 2:
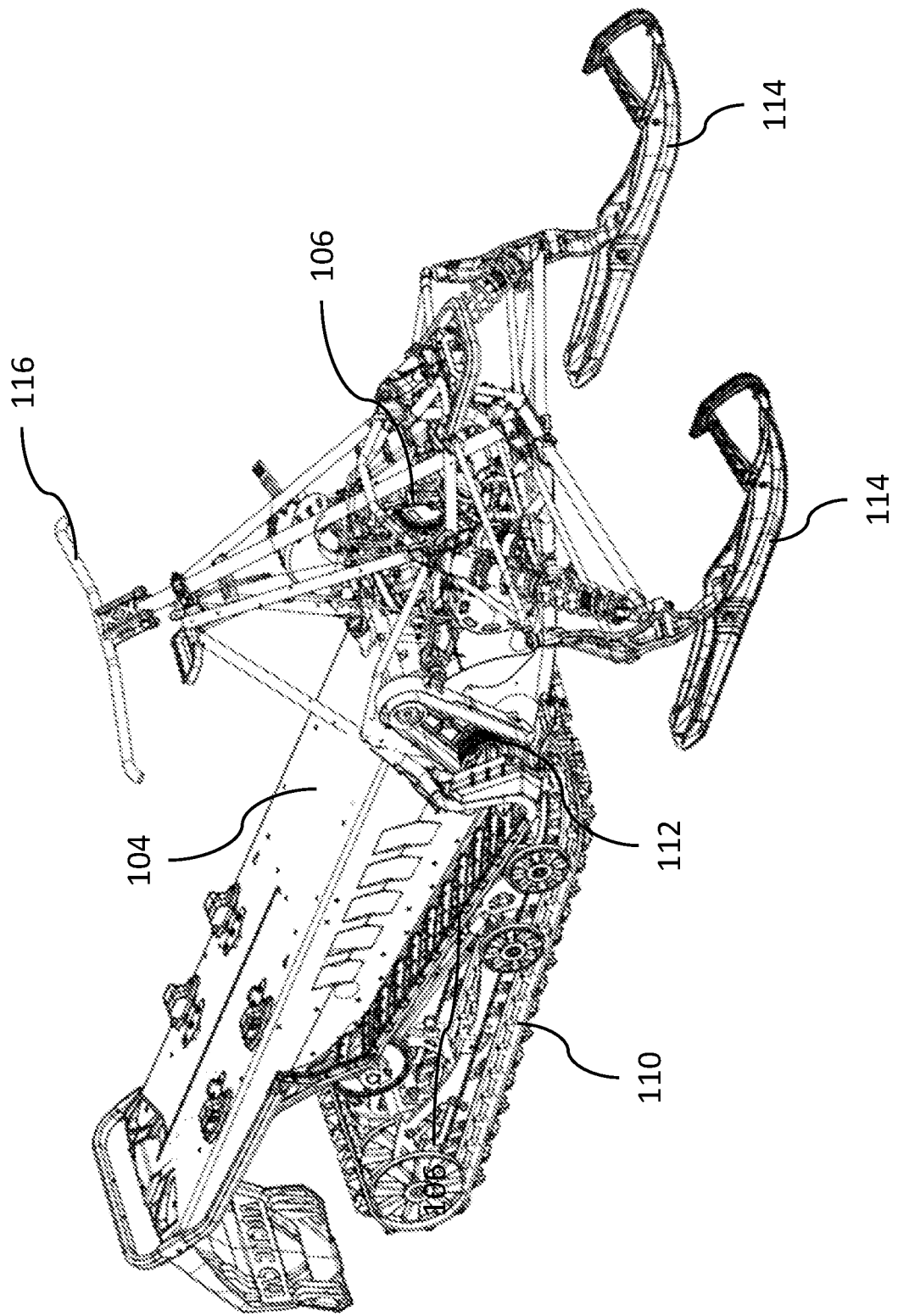
FIG. 2 illustrates a right side perspective view of a snowmobile with portions of the engine cover removed, according to some embodiments.
Figure 3:
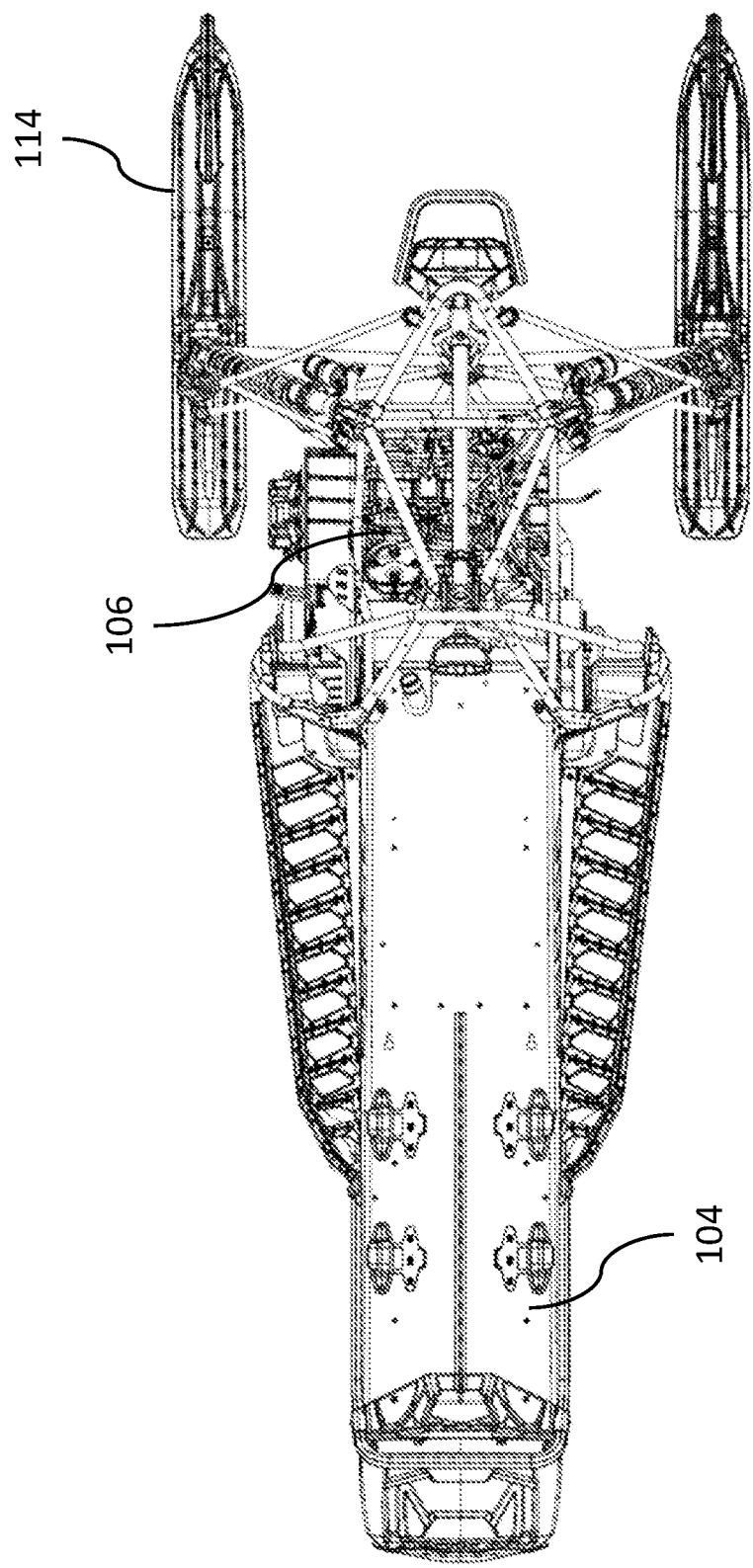
FIG. 3 illustrates a top view of a snowmobile with portions of the engine cover removed, according to some embodiments.
Figure 4:
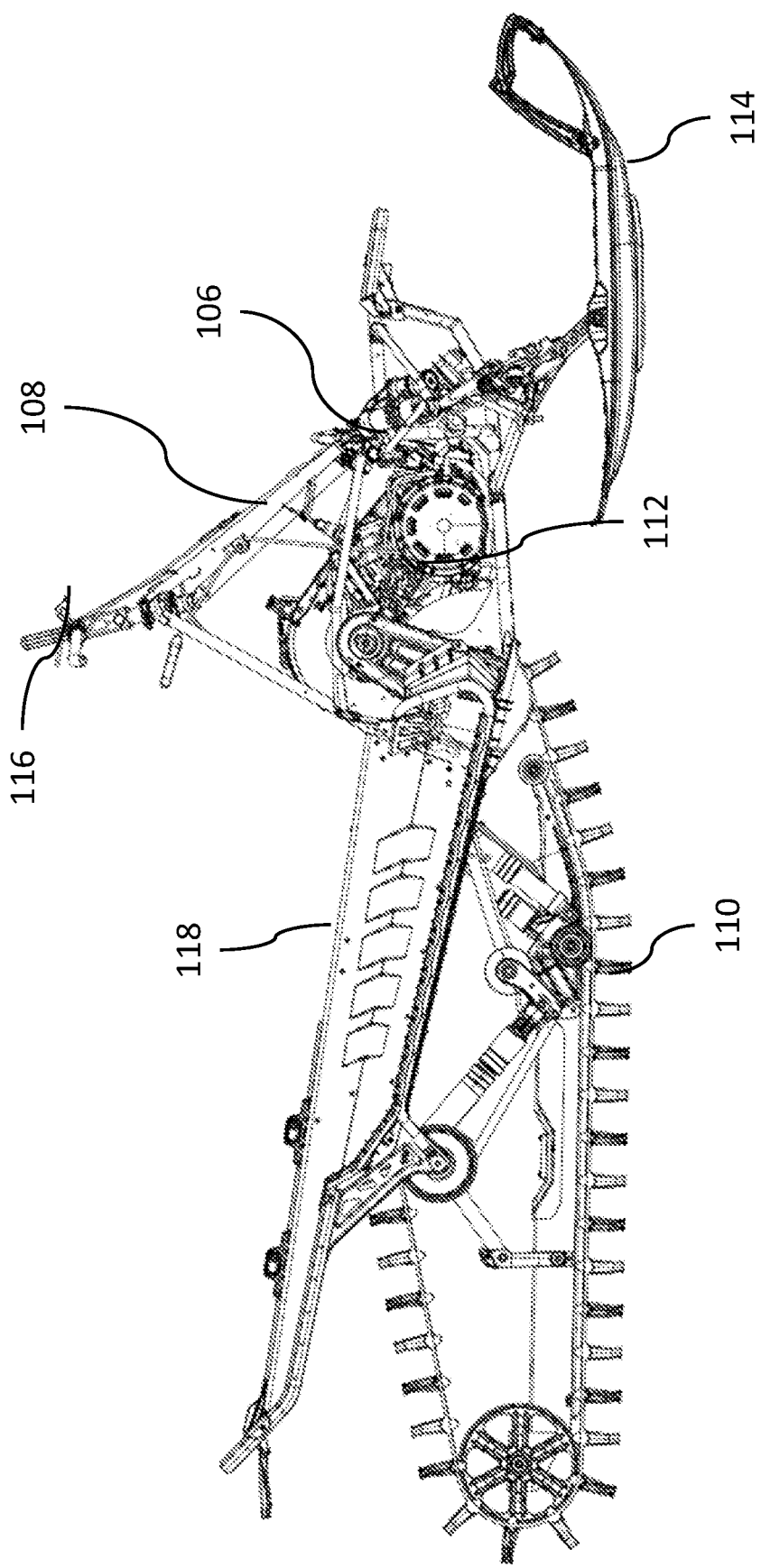
FIG. 4 illustrates a right side view of a snowmobile with portions of the engine cover removed, according to some embodiments.
Figure 5:
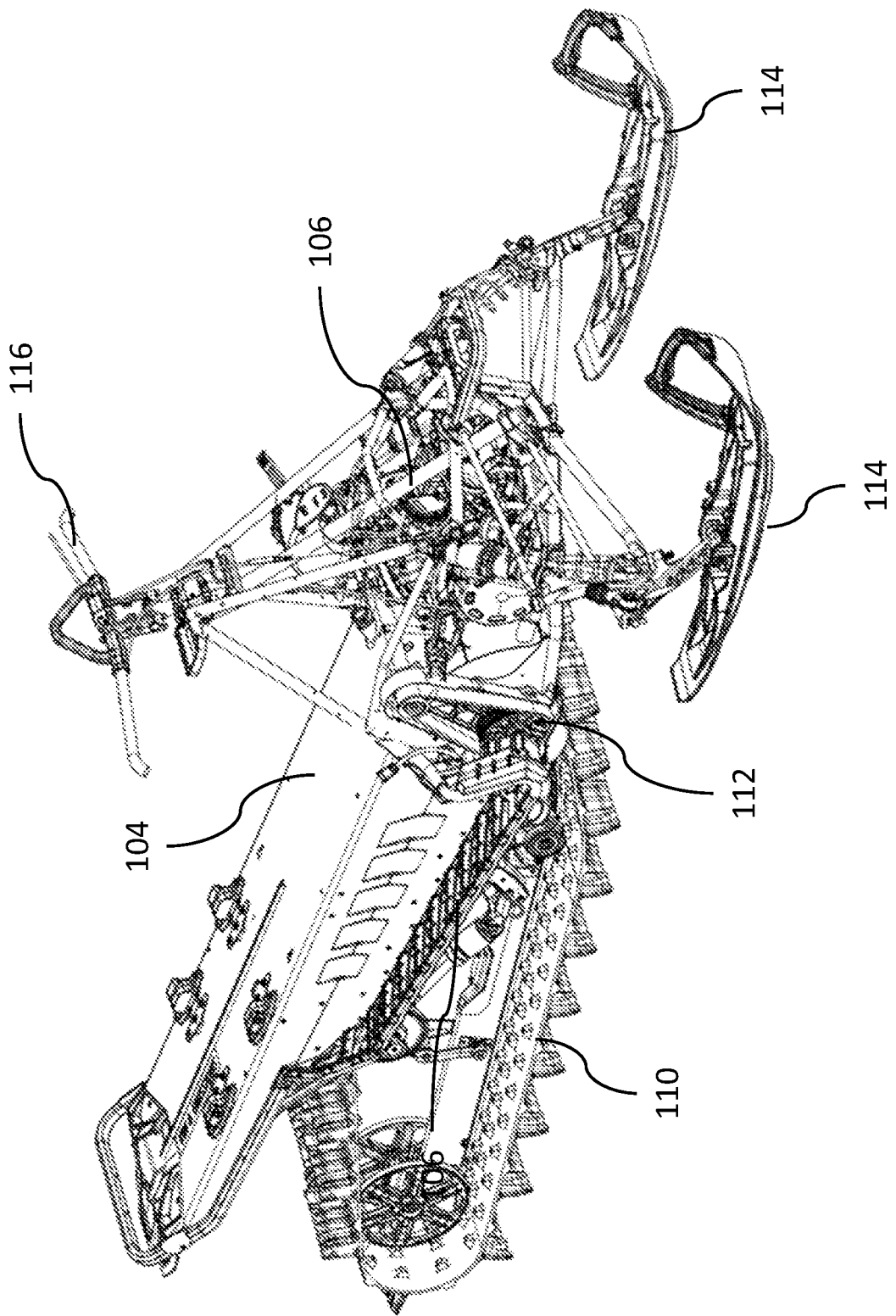
FIG. 5 illustrates a right side perspective view of a snowmobile with portions of the engine cover removed, according to some embodiments.
Figure 6:
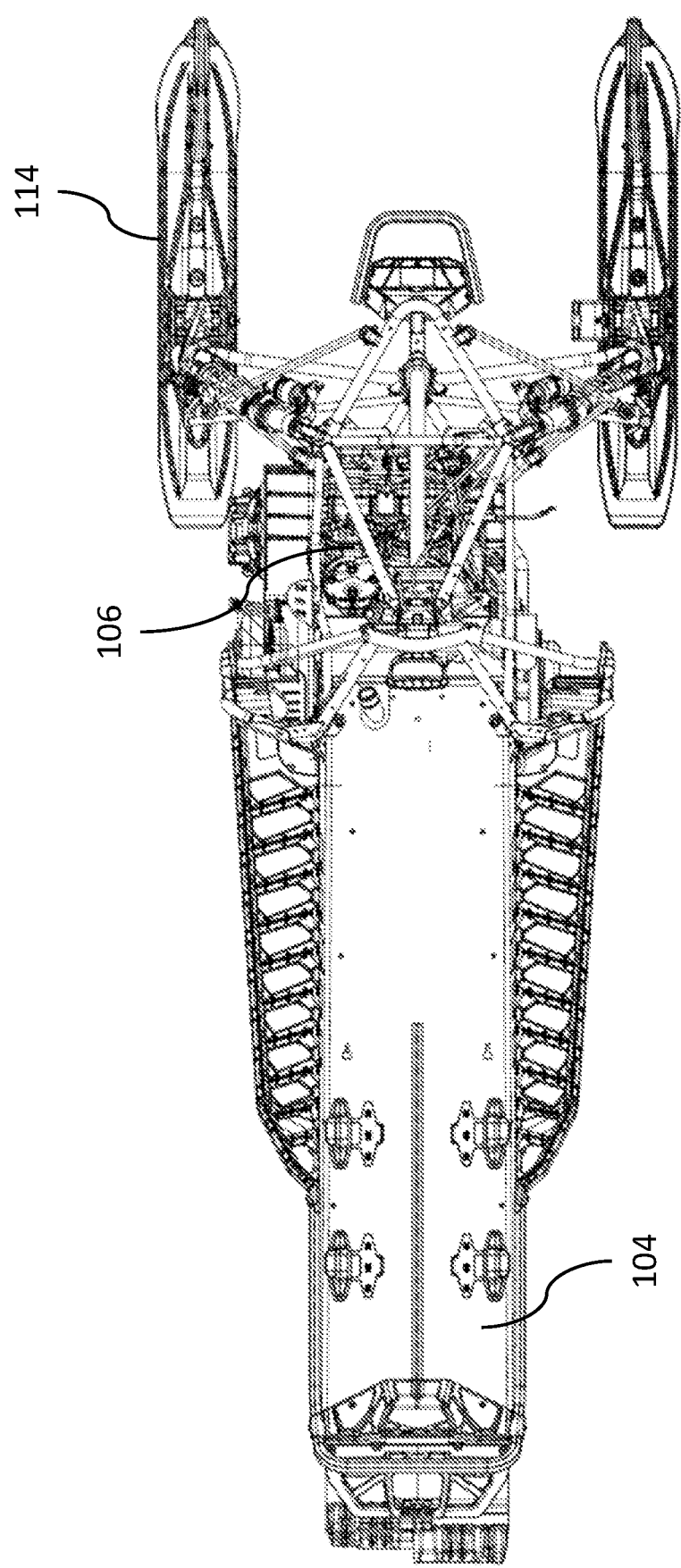
FIG. 6 illustrates a top view of a snowmobile with portions of the engine cover removed, according to some embodiments.
Figure 7:
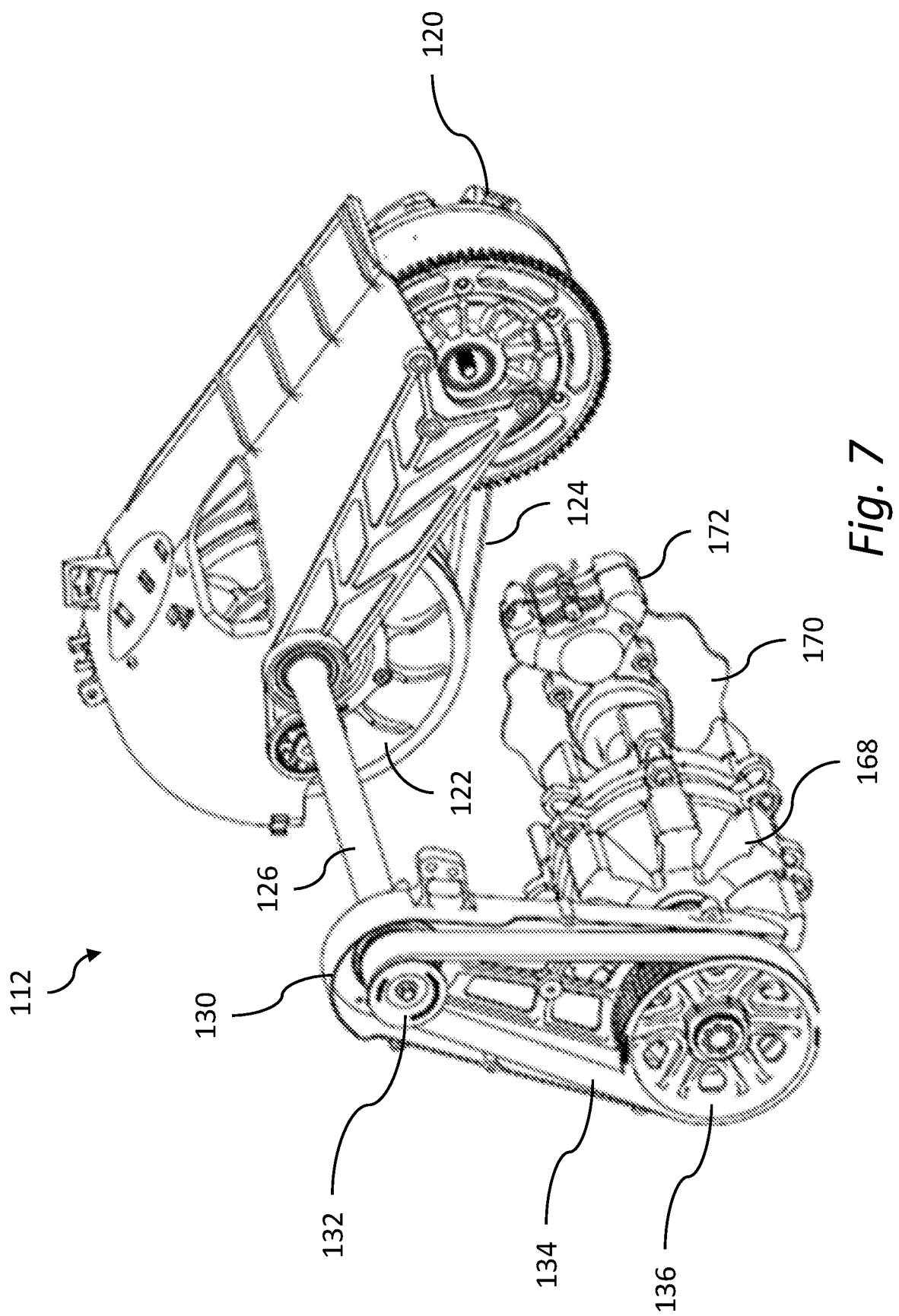
FIG. 7 illustrates a right side perspective view of a driveline of the snowmobile, according to some embodiments.
Figure 8:
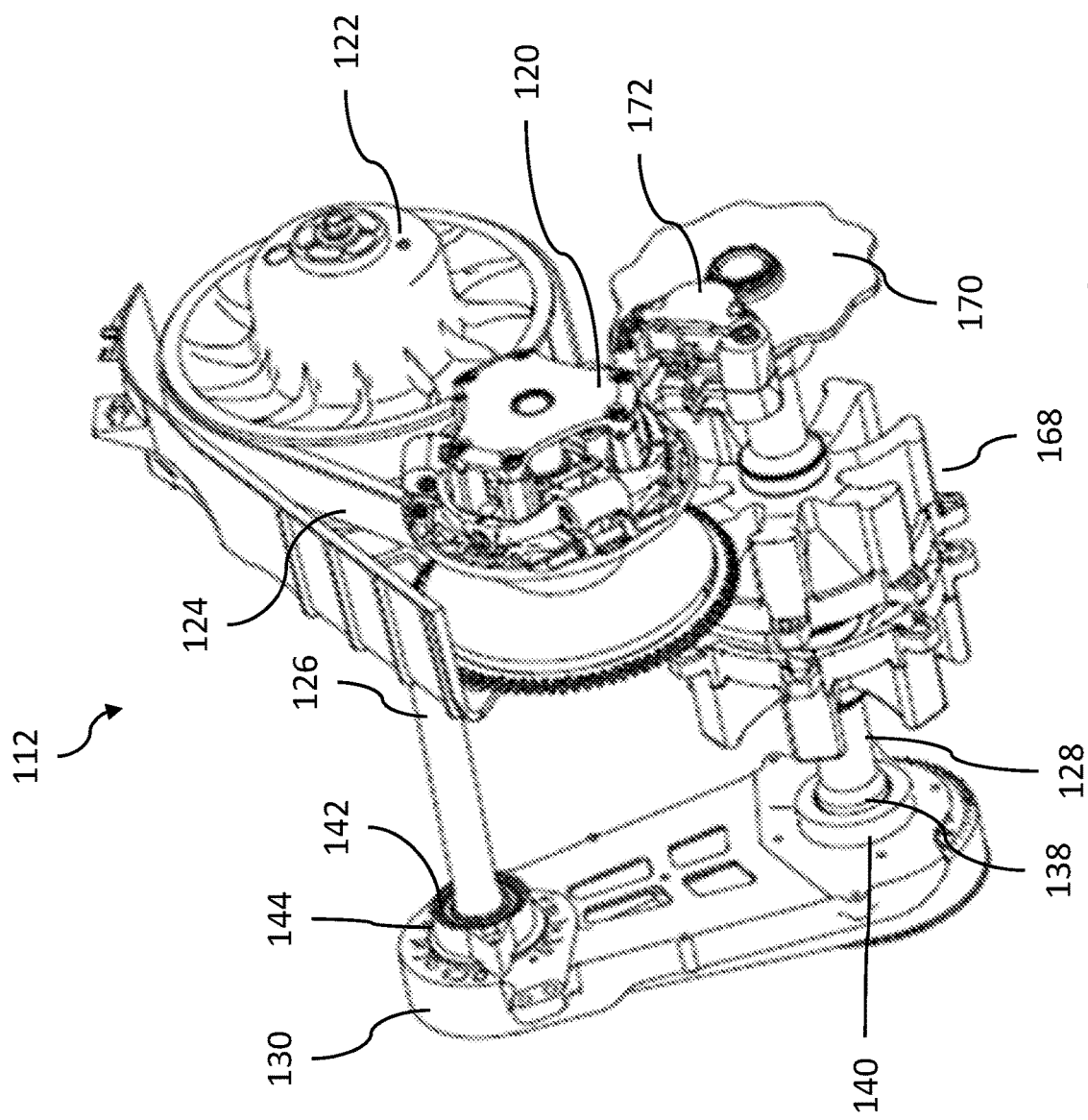
FIG. 8 illustrates a left side perspective view of the driveline of the snowmobile, according to some embodiments.
Figure 9:
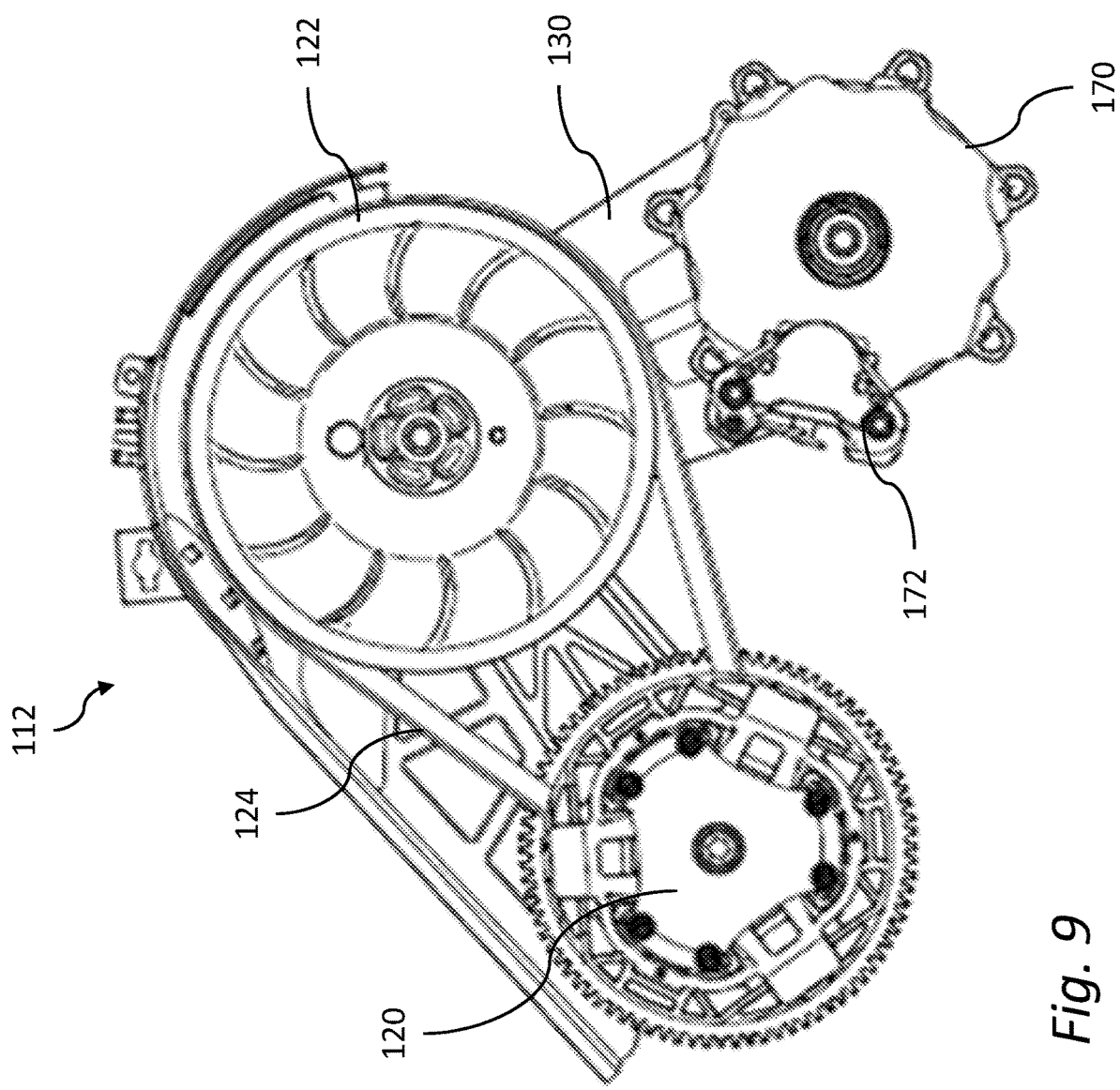
FIG. 9 illustrates a left side view of the driveline of the snowmobile, according to some embodiments.
Figure 10:
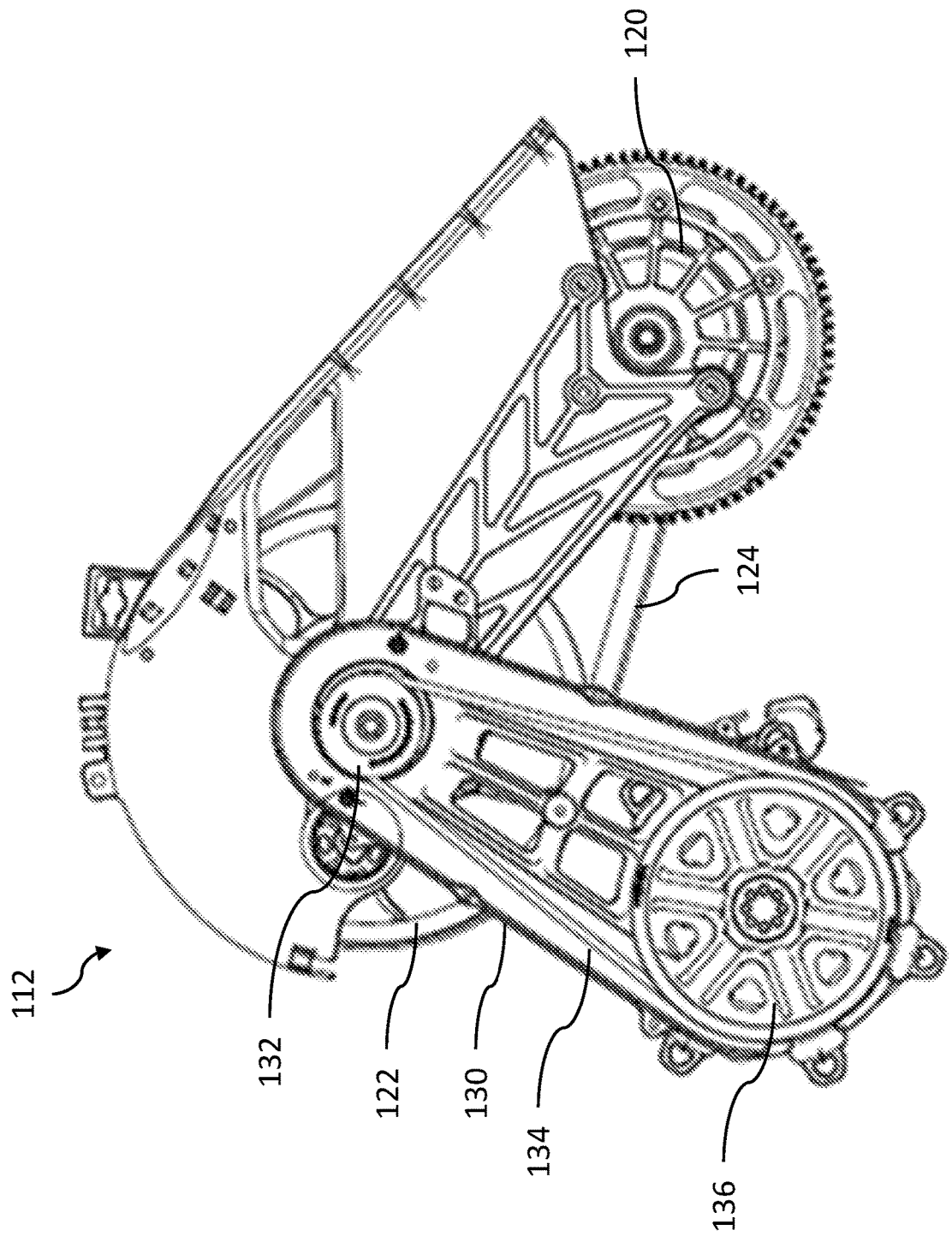
FIG. 10 illustrates a right side view of a driveline of the snowmobile, according to some embodiments.

Embodiments of the present disclosure describe a belt housing assembly that includes a bearing housing, a first bearing secured to the bearing housing for receiving a first shaft therethrough, the first bearing defines an axis of rotation; and a second bearing secured to the bearing housing for receiving a second shaft therethrough, the second bearing defines a second axis of rotation and is selectively movable with respect to the bearing housing from a first position to at least a second position, wherein a distance between the first bearing axis of rotation and the second bearing axis of rotation in the first position is different than the distance between the first bearing axis of rotation and the second bearing axis of rotation in the second position.

The belt housing assembly may be incorporated into an all-terrain vehicle illustrated here as a snowmobile 100, generally shown in FIGS. 1-6 that includes a chassis 102, a tunnel 104, an engine 106 attached to the chassis 102 and disposed within a motor or engine bay 108, a ground engagement member, in this example a drive track 110 disposed within the tunnel 104, and a drivetrain 112 configured to provide motive power from the engine 106 to the drive track 110. In alternative embodiments, the ground engagement member may be a wheel or tire. The snowmobile 100 further includes skis 114 interconnected to handlebars 116 that are used to turn the snowmobile 100 and a seat 118 for the snowmobile driver/passenger.

An isolated view of a non-limiting example of the drivetrain 112 is shown in FIGS. 7-15. Motive power developed by the engine 106 is communicated to a primary clutch 120 by a drive shaft (not shown). This primary clutch 120 and a secondary clutch 122 are connected by a belt 124 to form a continuously variable transmission (CVT), which communicates the power received from engine 106 to a jack shaft 126. The primary clutch 120 and the secondary clutch 122 each include both a stationary sheave and a movable sheave. As the speed of the engine 106 increases, the movable sheaves are actuated toward or away from the stationary sheave, to selectively alter the effective gear ratio of the CVT. Motive power is communicated from the secondary clutch 122 of the CVT to the jack shaft 126, which in turn communicates power to a track drive shaft 128, to provide power to the drive track 110. In the embodiment shown, a belt housing assembly 130 includes a top drive sprocket 132 connected to receive power from the jack shaft 126, and in turn coupled by another belt 134 to a bottom drive sprocket 136. The bottom drive sprocket 136 drives the track drive shaft 128 to transfer motive power to the drive track 110.

The belt housing assembly 130 includes a first bearing 138 that is contained in a fixed bearing retainer 140. The fixed bearing retainer 140 is a first bearing cavity that is integrally formed in the belt housing assembly 130. The belt housing assembly 130 may be formed of a cast metal, such as aluminum, although other metallic or composite materials may be employed. In alternative embodiments, the fixed bearing retainer may be formed separately from the belt housing assembly. This first bearing, hereinafter referred to as the drive shaft bearing 138 supports an end of the track drive shaft 128 located near the bottom drive sprocket 136.

Figure 21B:
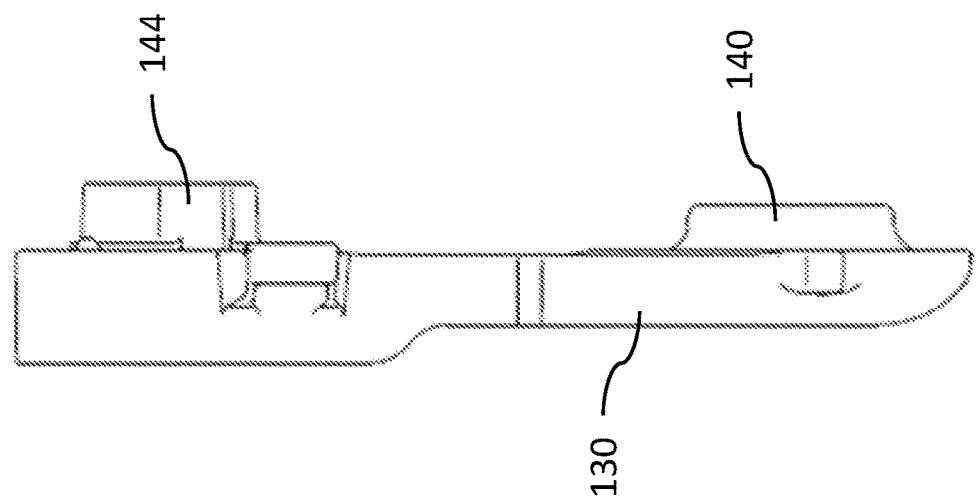
FIG. 21B illustrates a side view of a shaft positioning arm and bearings of the right side of the driveline of the snowmobile, according to some embodiments.
Figure 21A:
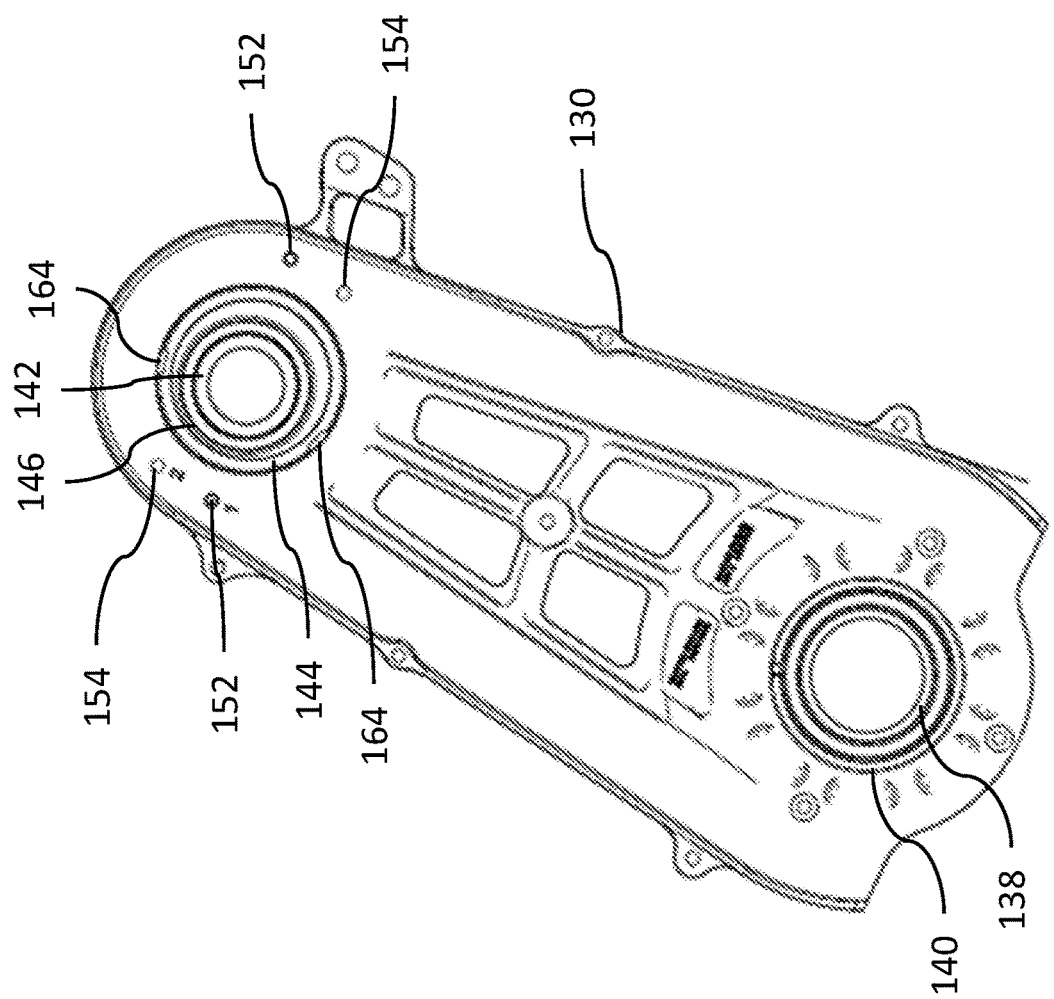
FIG. 21A illustrates a front view of a shaft positioning arm and bearings of the right side of the driveline of the snowmobile, according to some embodiments.
Figure 25:
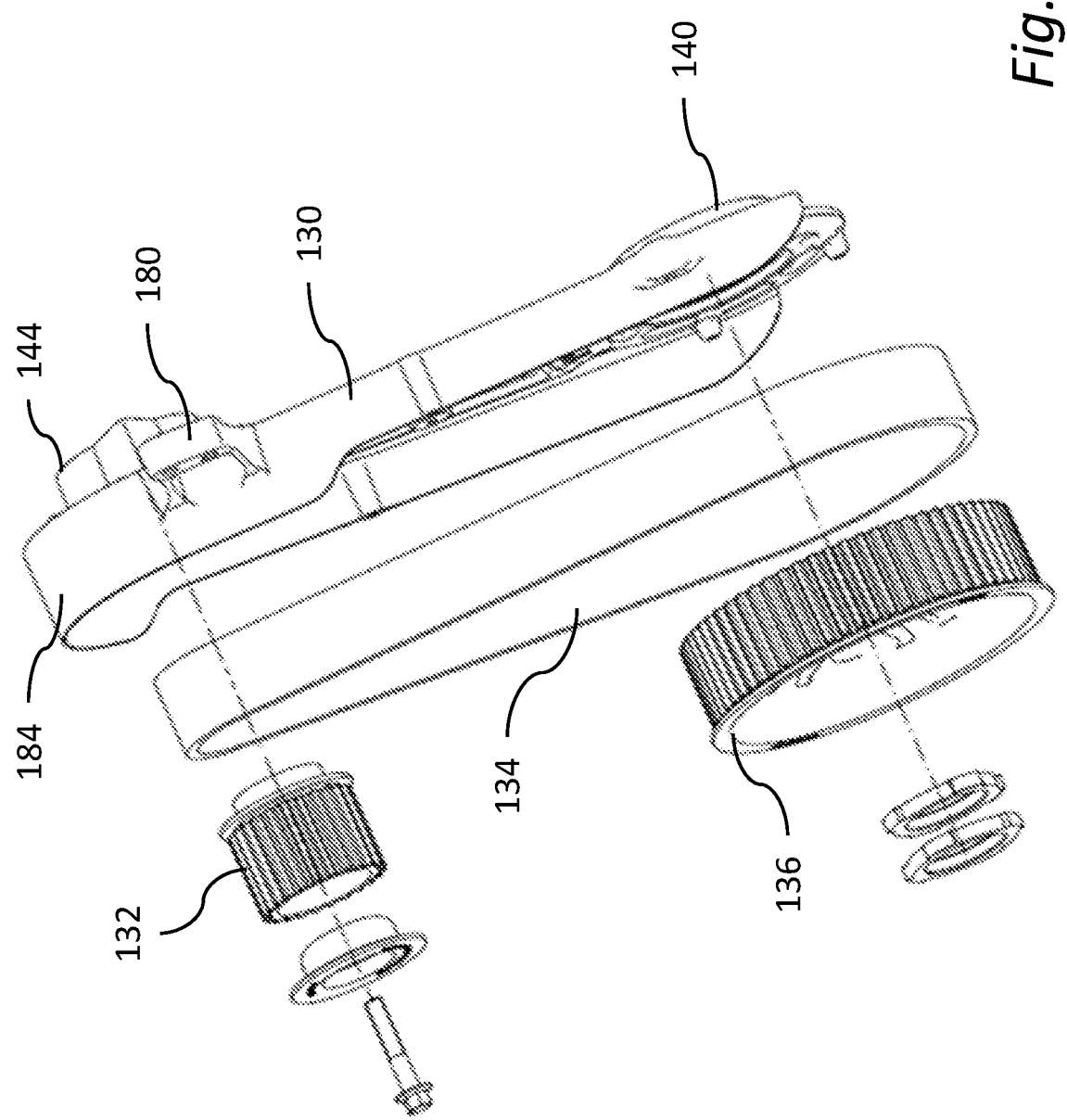
FIG. 25 illustrates an exploded view of the right side of the driveline of the snowmobile, according to some embodiments.
Figure 26A:
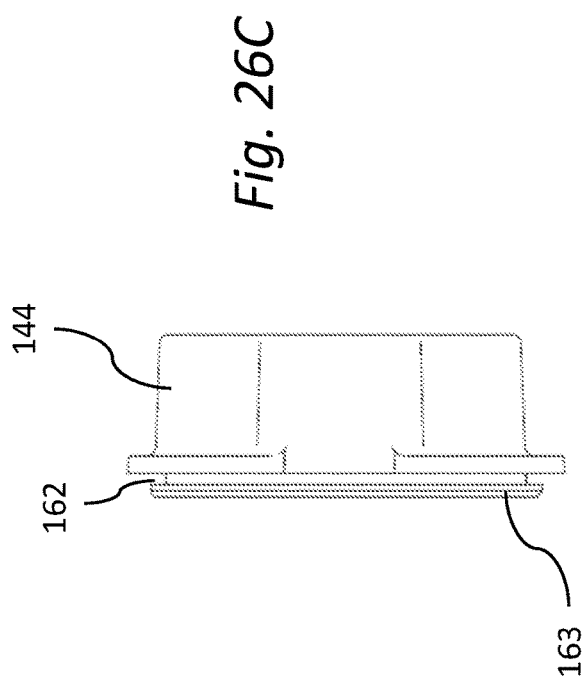
FIG. 26A illustrates a front view of an eccentric bearing retainer of the driveline of the snowmobile, according to some embodiments.
Figure 26C:
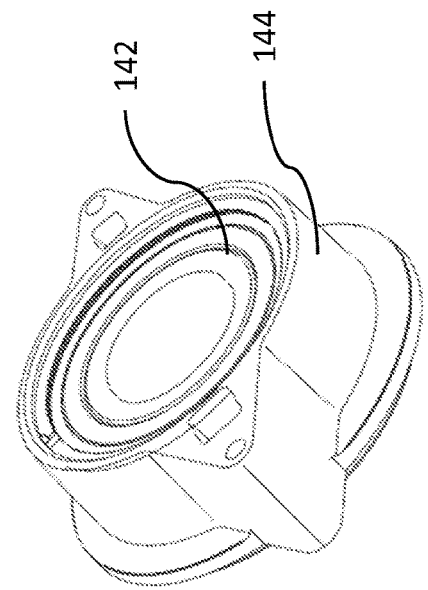
FIG. 26C illustrates a side view of an eccentric bearing retainer of the driveline of the snowmobile, according to some embodiments.
Figure 26B:
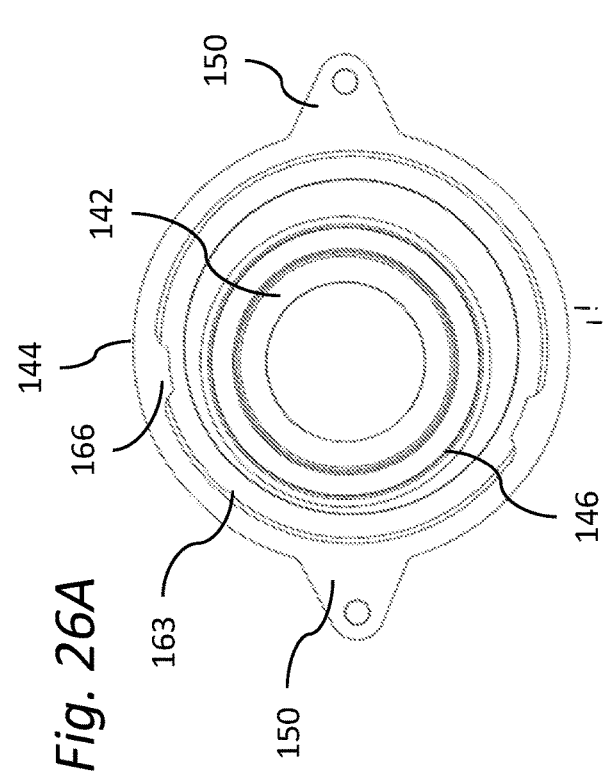
FIG. 26B illustrates a rear view of an eccentric bearing retainer of the driveline of the snowmobile, according to some embodiments.
Figure 26D:
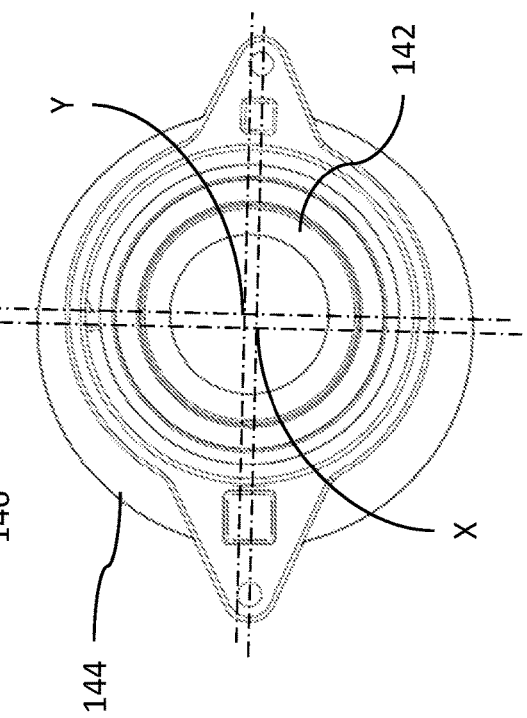
FIG. 26D illustrates a perspective view of an eccentric bearing retainer of the driveline of the snowmobile, according to some embodiments.

The end of the jack shaft 126 near the top drive sprocket 132 is supported by a second bearing, hereinafter referred to as the jack shaft bearing 142 that is secured within an eccentric bearing retainer 144 that is selectively movable with respect to the belt housing assembly 130. The bearing retainer may be separate from, or integral with the belt housing assembly 130. The eccentric bearing retainer 144 is configured to rotate about an axis of rotation X of the eccentric bearing retainer 144. The eccentric bearing retainer 144 has a second bearing cavity 146 in which the jack shaft bearing 142 is retained. This second bearing cavity 146 is located and arranged such that an axis Y of the jack shaft 126 is eccentric to, i.e., offset from, the axis of rotation X of the eccentric bearing retainer 144. As the eccentric bearing retainer 144 is rotated about its axis of rotation X, a distance between the centers of the jack shaft 126 and the track drive shaft 128 changes, thereby changing the distance between the top and bottom drive sprockets 132, 136 and the circumference around the top and bottom drive sprockets 132, 136. The eccentric bearing retainer 144 is secured to the belt housing assembly 130 by a pair of fasteners (not shown), in this example threaded fasteners that are engaged in threaded bosses 150 that may be positioned in a protruding portion of the eccentric bearing retainer 144 that may be characterized as "ears", "wings", "handles", or "actuators" that are configured to be grasped by a user to rotate the eccentric bearing retainer 144. The belt housing assembly defines numerous sets of holes 152, 154 around an opening 156 in which the eccentric bearing retainer 144 is disposed as shown in FIGS. 21A and 21B. When the threaded bosses 150 in the eccentric bearing retainer 144 are aligned with the first set of holes 152 in the belt housing assembly 130 as shown in FIGS. 22A and 22B, there is a first distance 158 between the jack shaft 126 and the track drive shaft 128 and thereby the top and bottom drive sprockets 132, 136. When the eccentric bearing retainer 144 is rotated to align the threaded bosses 150 in the eccentric bearing retainer 144 with the second set of holes 154 in the belt housing assembly as shown in FIGS. 23A and 23B, there is a different second distance 160 between the jack shaft 126 and the track drive shaft 128 and thereby the top and bottom drive sprockets 132, 136. Accordingly, the eccentric bearing retainer 144 can be secured to the belt housing assembly 130 with the fasteners to prevent further rotation when in the desired position. Although only two positions are shown, it is to be understood that the number of holes 152 and 154 is not limited, and additional holes can be provided to accommodate additional positions. In yet other embodiments, the holes 152, 154 may be replaced by arcuate slots to provide more degrees of available rotation of the eccentric bearing retainer 144 and more finely tune the distance between the top and bottom drive sprockets 132, 136. It is also to be understood that different mechanisms may be used to prevent further rotation of the bearing retainer 144 when in the desired position. For example, the eccentric bearing retainer 144 may include a spring-biased member that extends into the holes 152, 154 when aligned therewith, and can be retracted therefrom when further rotation of the eccentric bearing retainer is desired.

The eccentric bearing retainer 144 defines a cylindrical groove 162 and notched flange 163 illustrated in FIGS. 26A-26D. The eccentric bearing retainer 144 is rotatably attached to the belt housing assembly 130 by pair of tabs 164 projecting from the belt housing assembly 130 into the opening 156 that are received within the groove 162 through a pair of notches 166 in the notched flange as shown in FIGS. 19A-20B. This pair of notches 166 is arranged so that the tabs 164 are offset from the pair of notches 166 when the threaded bosses 150 are aligned with the first or second sets of holes 152, 154 in the belt housing assembly 130. The offset tabs will only allow the eccentric bearing retainer 144 to be placed into the opening 156 in one orientation to ensure that the distance between the top and bottom drive sprockets 132, 136 is in the proper range. In alternative embodiments, the tabs may have different sizes rather than be offset to ensure that the eccentric bearing retainer 144 can be placed into the opening 156 in only one orientation. These tabs 164 allow the eccentric bearing retainer 144 to be preassembled to the belt housing assembly 130 prior to the fasteners being inserted into the holes 152, 154.

Figure 11:
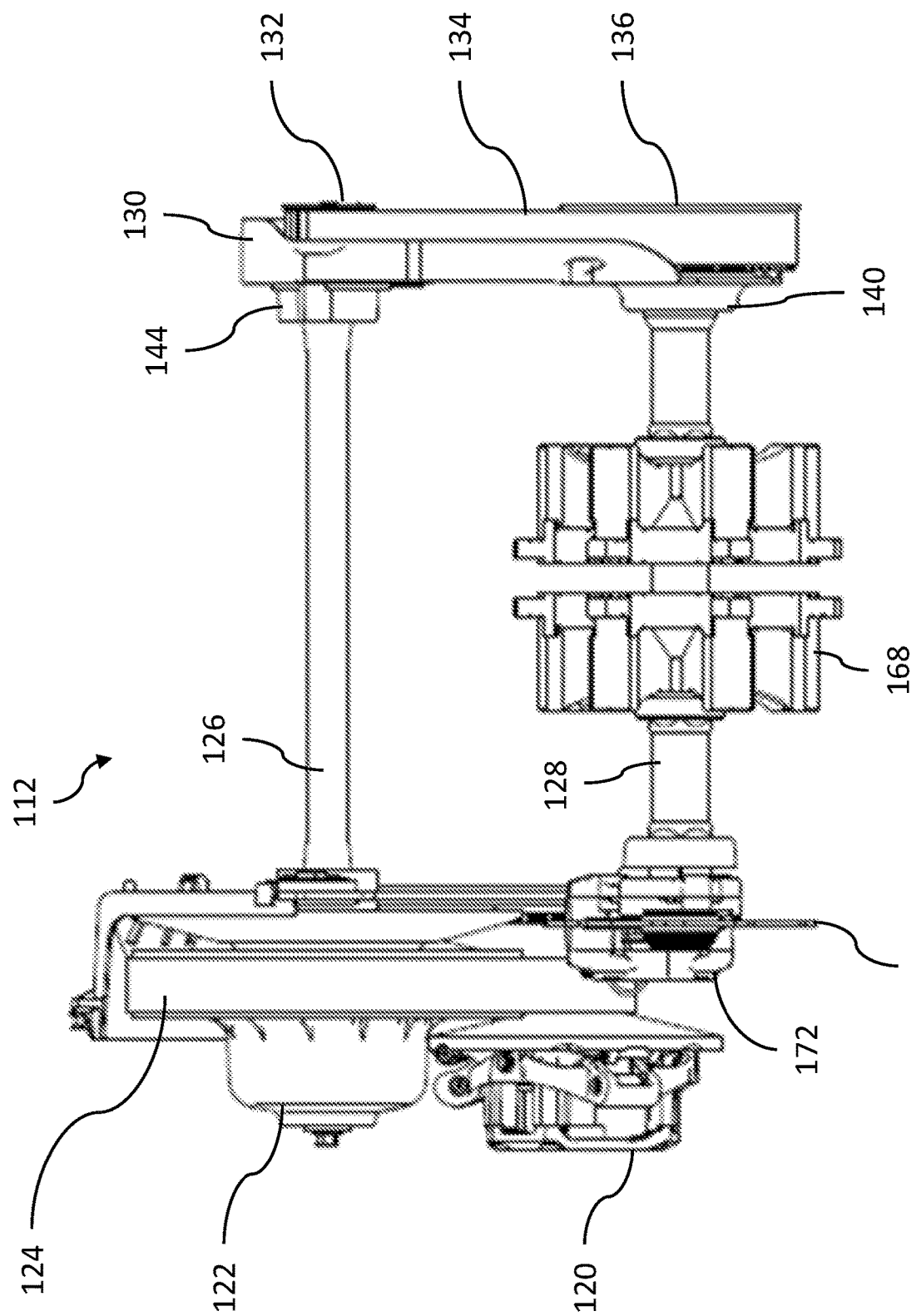
FIG. 11 illustrates an end view of a driveline of the snowmobile, according to some embodiments.
Figure 12:
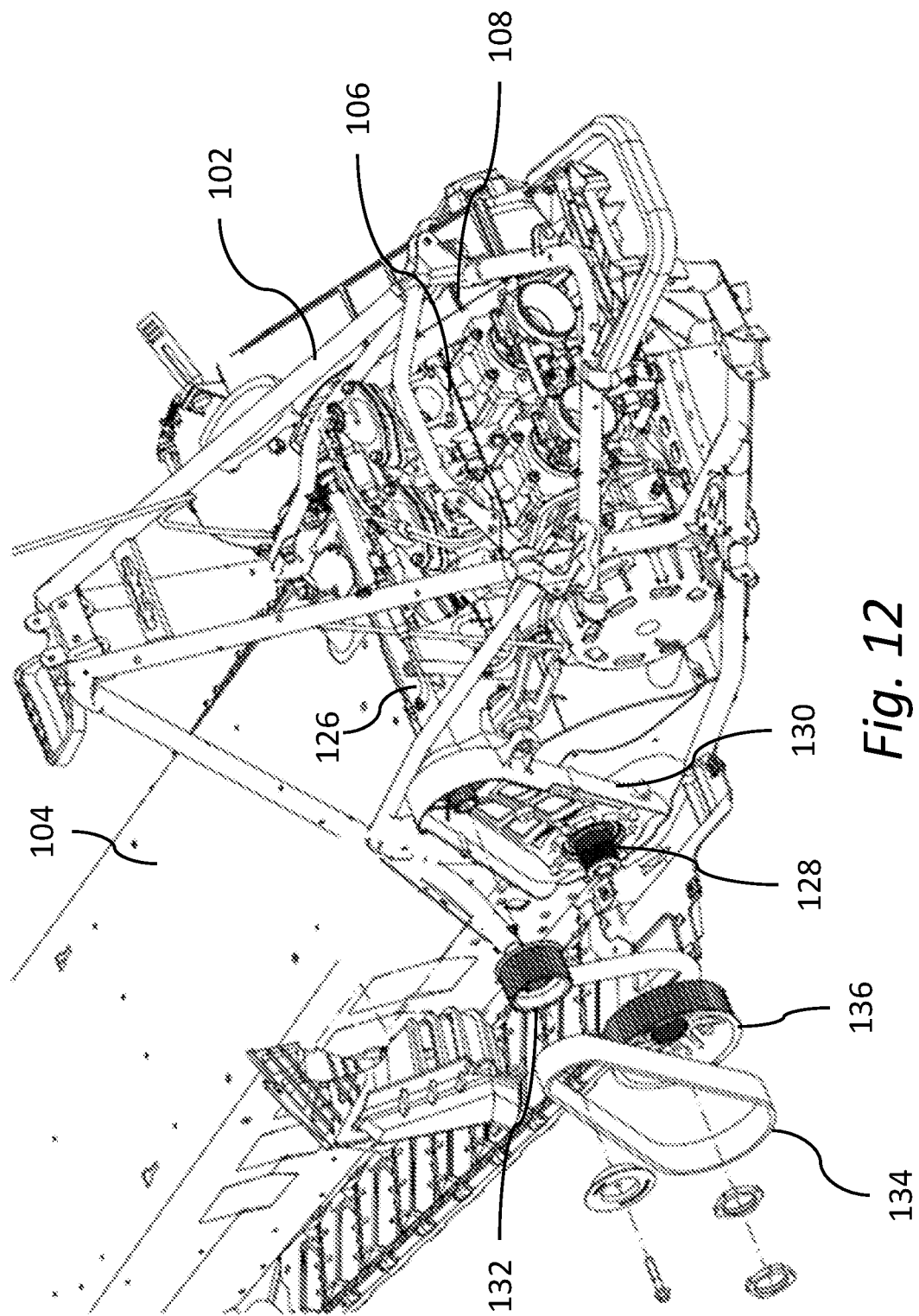
FIG. 12 illustrates an exploded view of the drive belt and sprockets of the driveline of the snowmobile, according to some embodiments.
Figure 13:
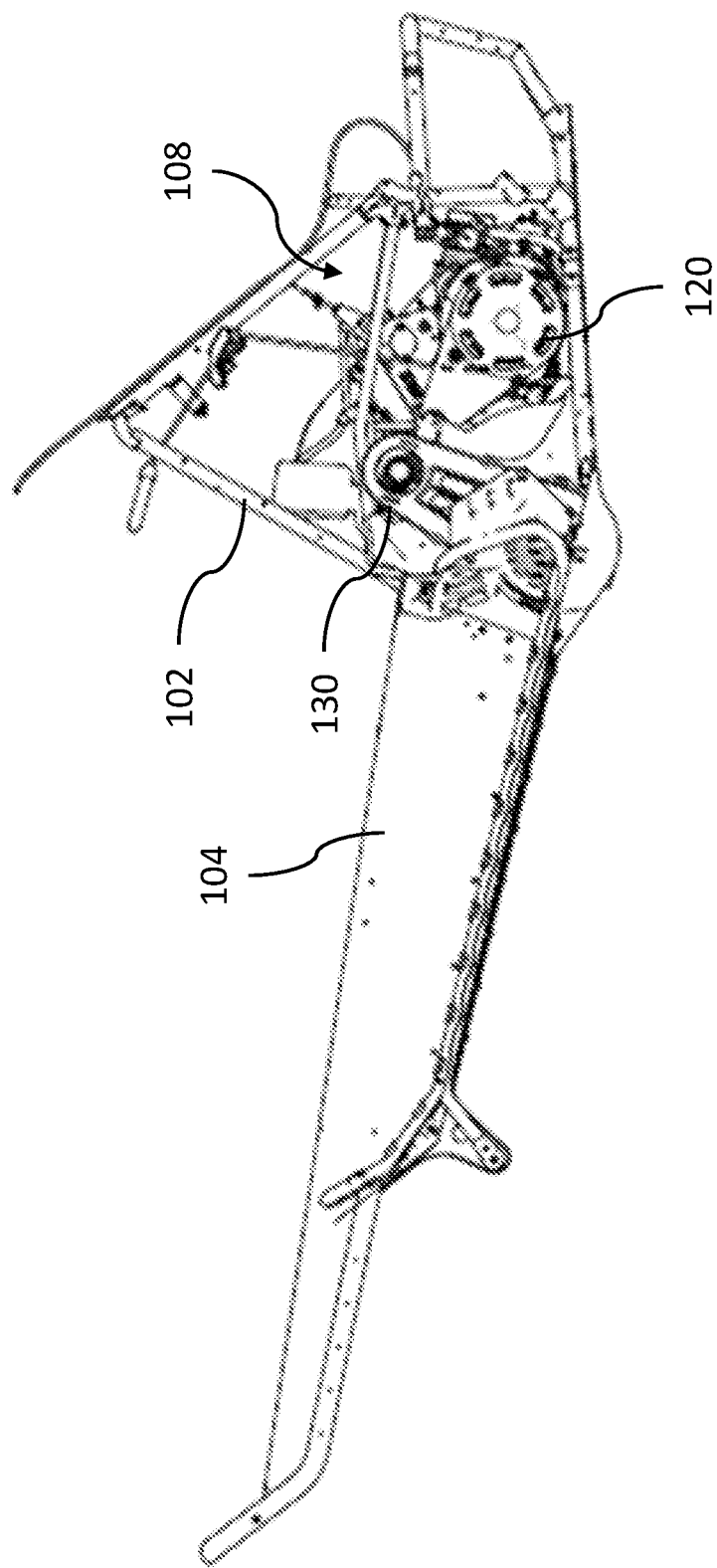
FIG. 13 illustrates a right side view of the snowmobile with all engine covers removed, according to some embodiments.
Figure 14:
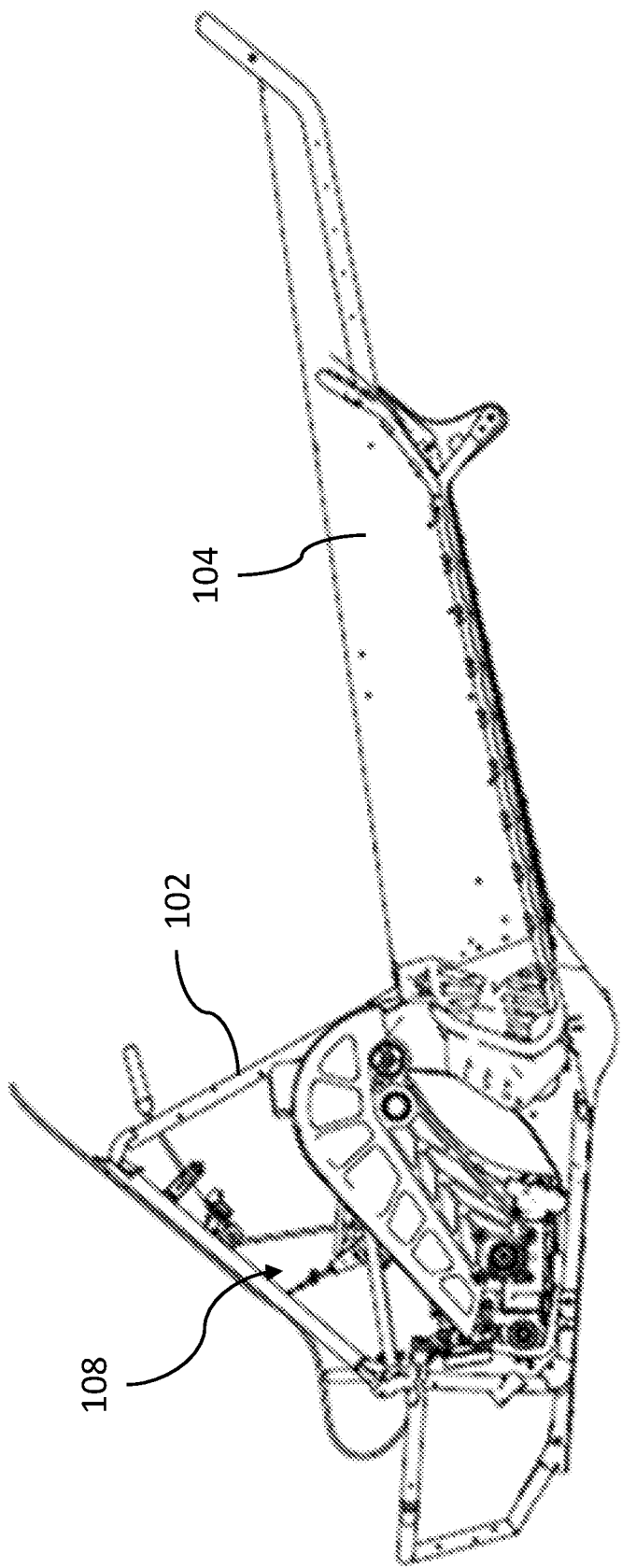
FIG. 14 illustrates a left side view of the snowmobile with all engine covers removed, according to some embodiments.
Figure 15:
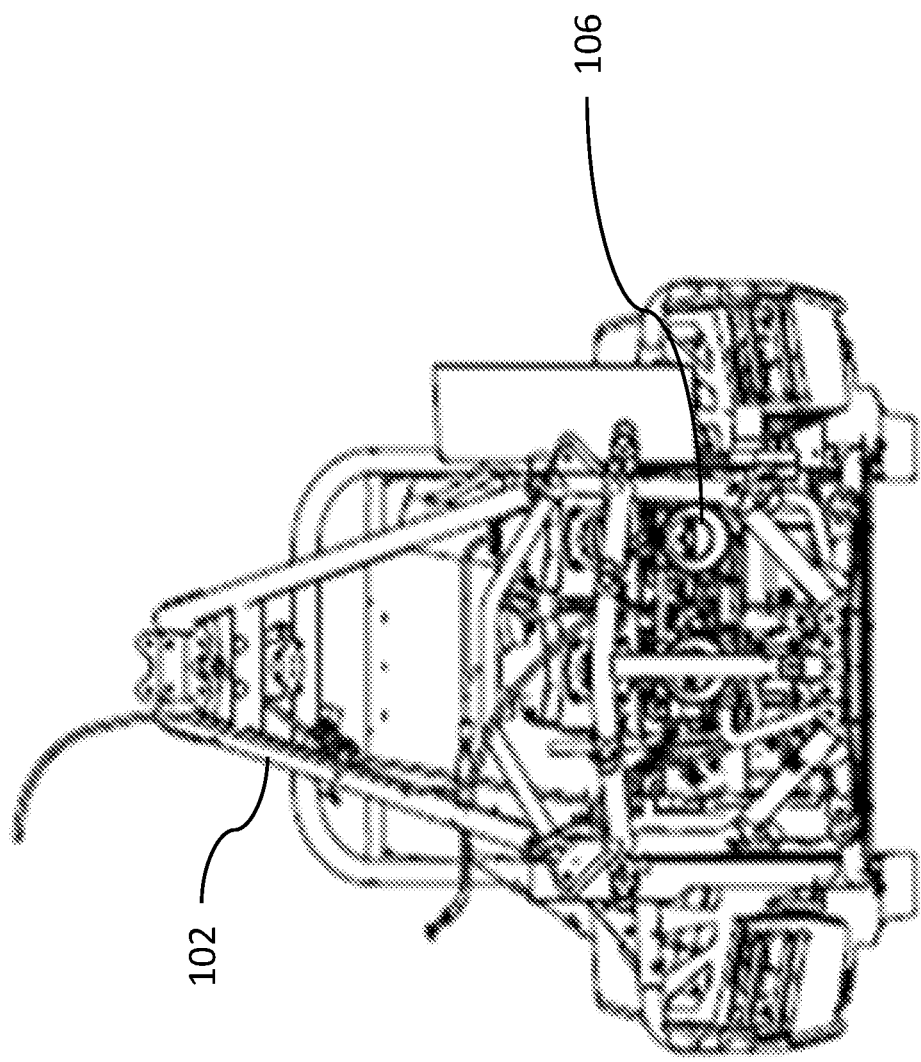
FIG. 15 illustrates a front view of the snowmobile with all engine covers removed, according to some embodiments.
Figure 16:
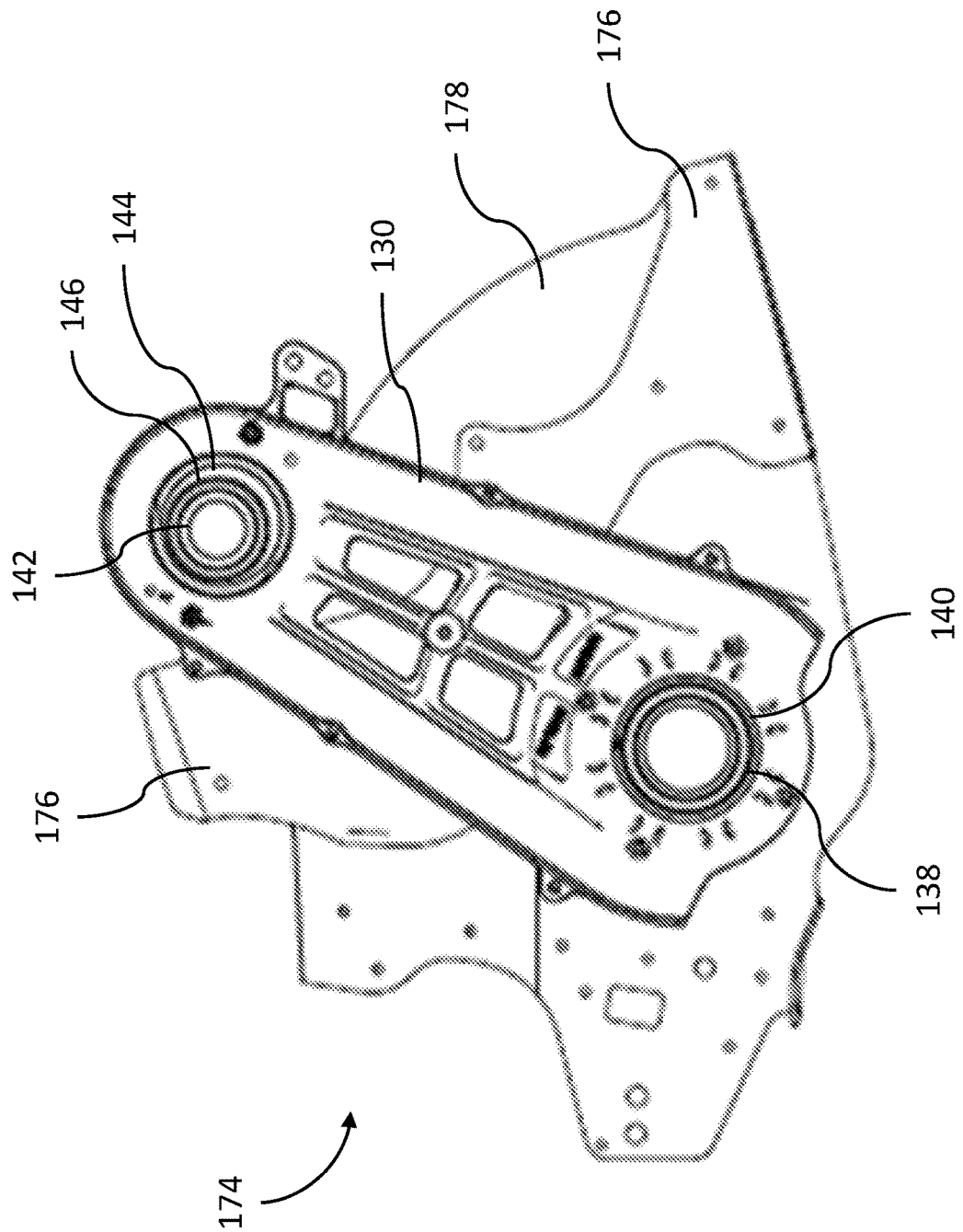
FIG. 16 illustrates a front view of the right side of the driveline of the snowmobile with the drive belt and sprockets removed, according to some embodiments.
Figure 17B:
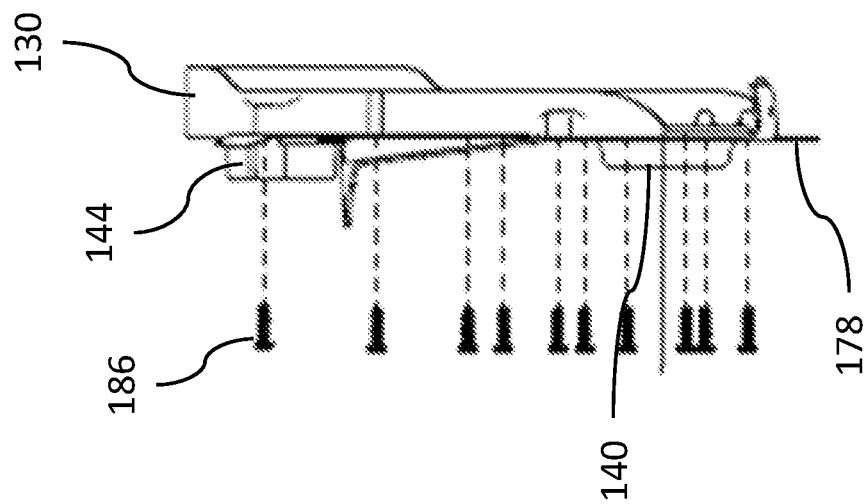
FIG. 17B illustrates a side view of the right side of the driveline of the snowmobile with the drive belt, drive shafts, and sprockets removed, according to some embodiments.
Figure 17A:
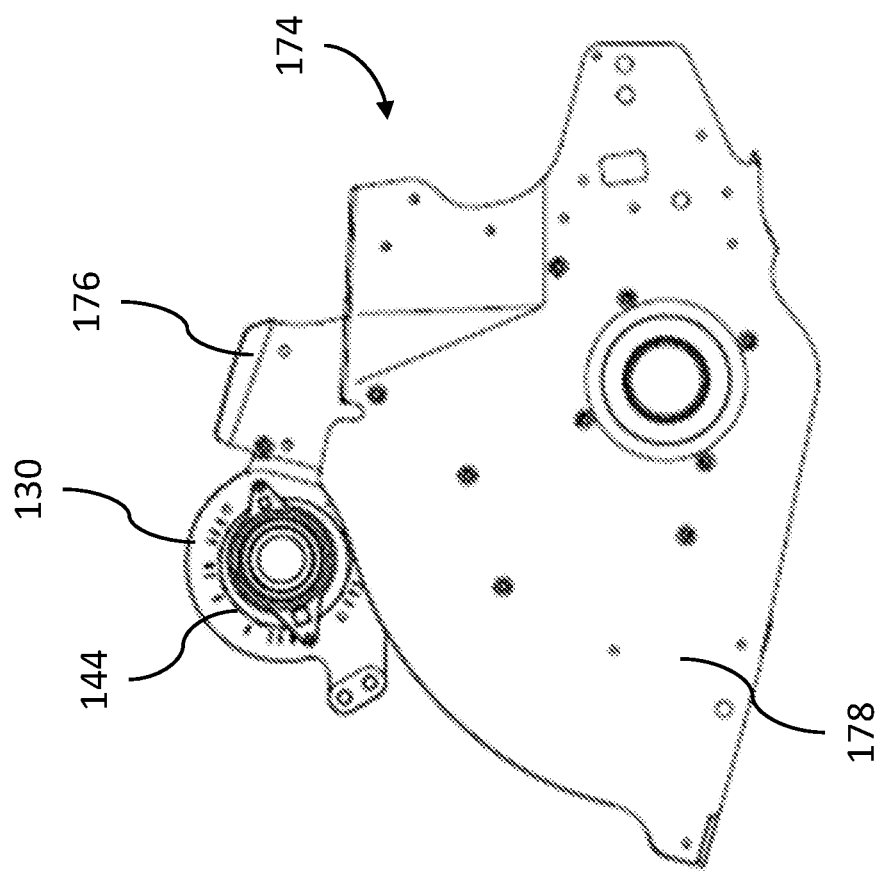
FIG. 17A illustrates a rear view of the right side of the driveline of the snowmobile with the drive belt and sprockets removed, according to some embodiments.
Figure 18B:
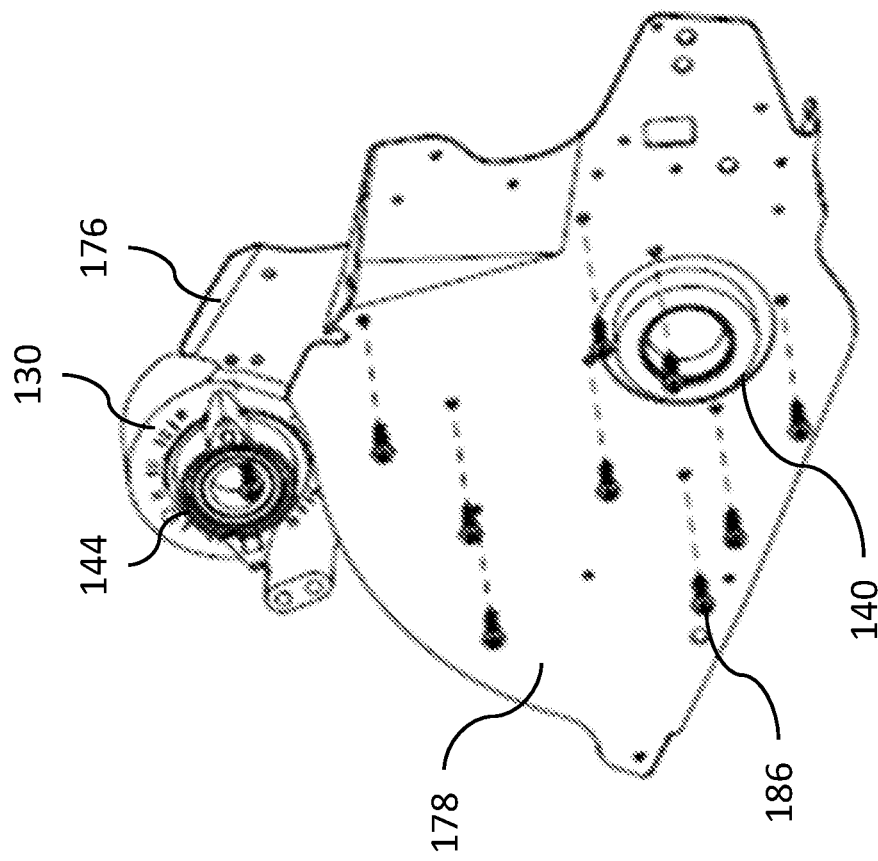
FIGS. 18A and 18B illustrate perspective rear views of the right side of the driveline of the snowmobile with the drive shafts removed, according to some embodiments.
Figure 18A:
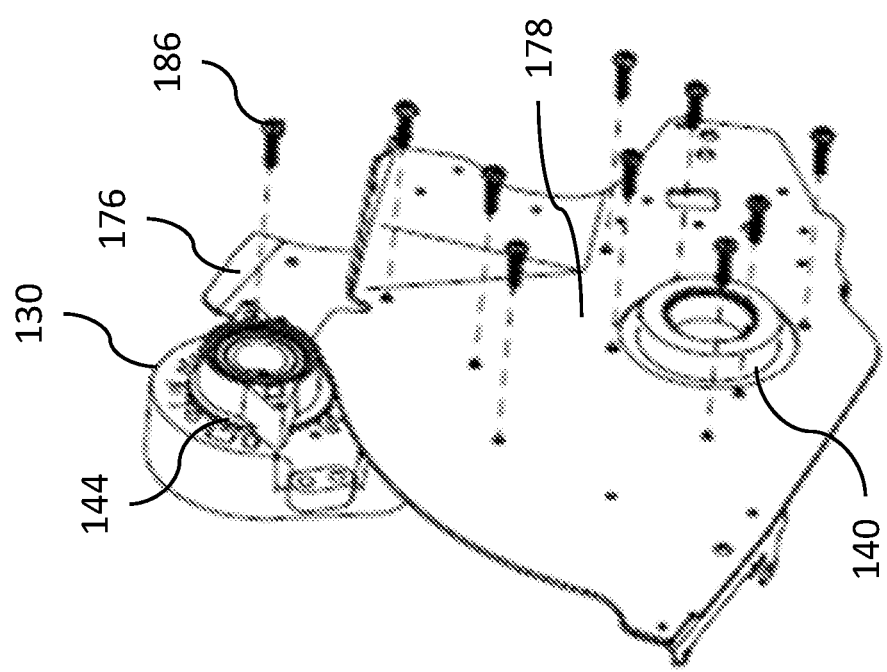
Figure 19B:
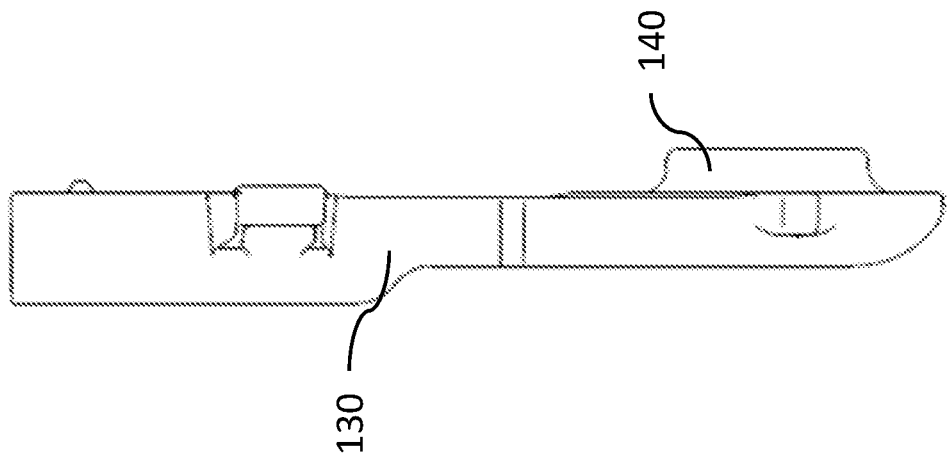
FIG. 19B illustrates a side view of a shaft positioning arm of the right side of the driveline of the snowmobile, according to some embodiments.
Figure 19A:
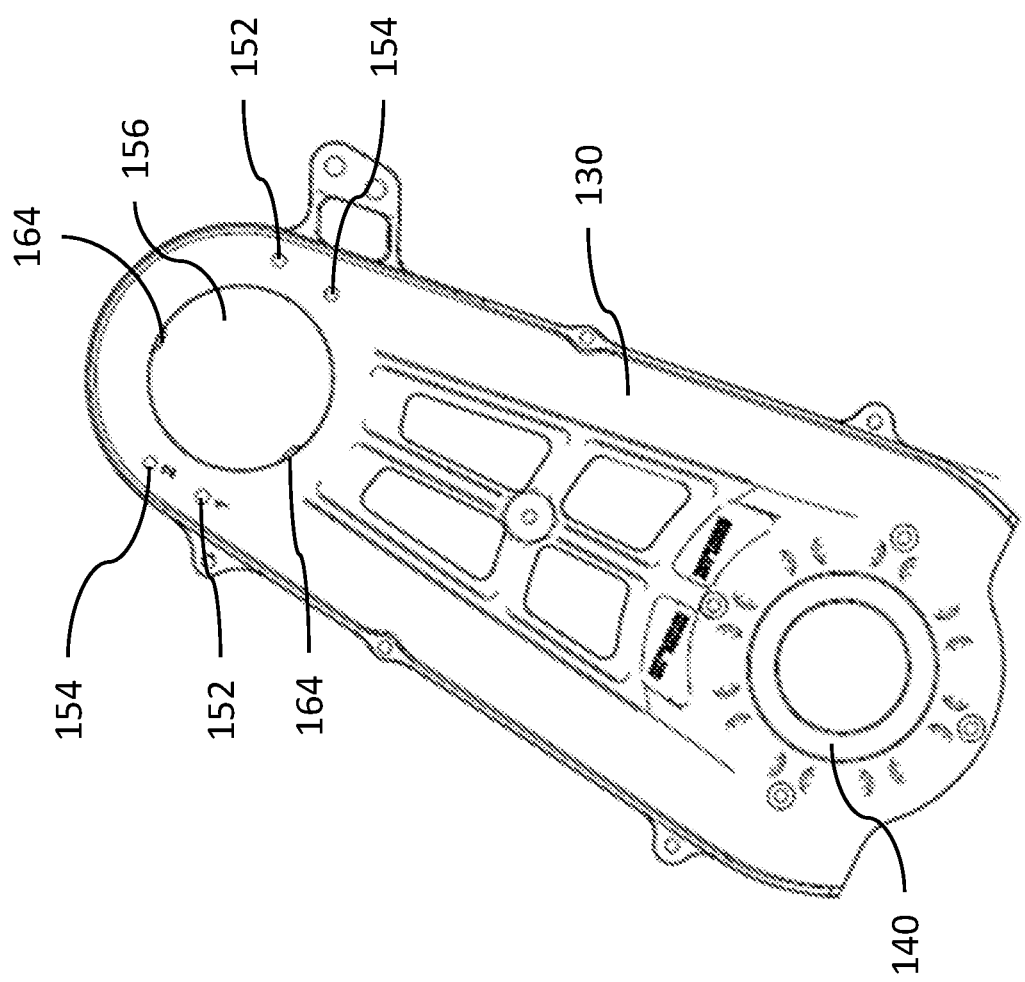
FIG. 19A illustrates a front view of a shaft positioning arm of the right side of the driveline of the snowmobile, according to some embodiments.
Figure 20B:
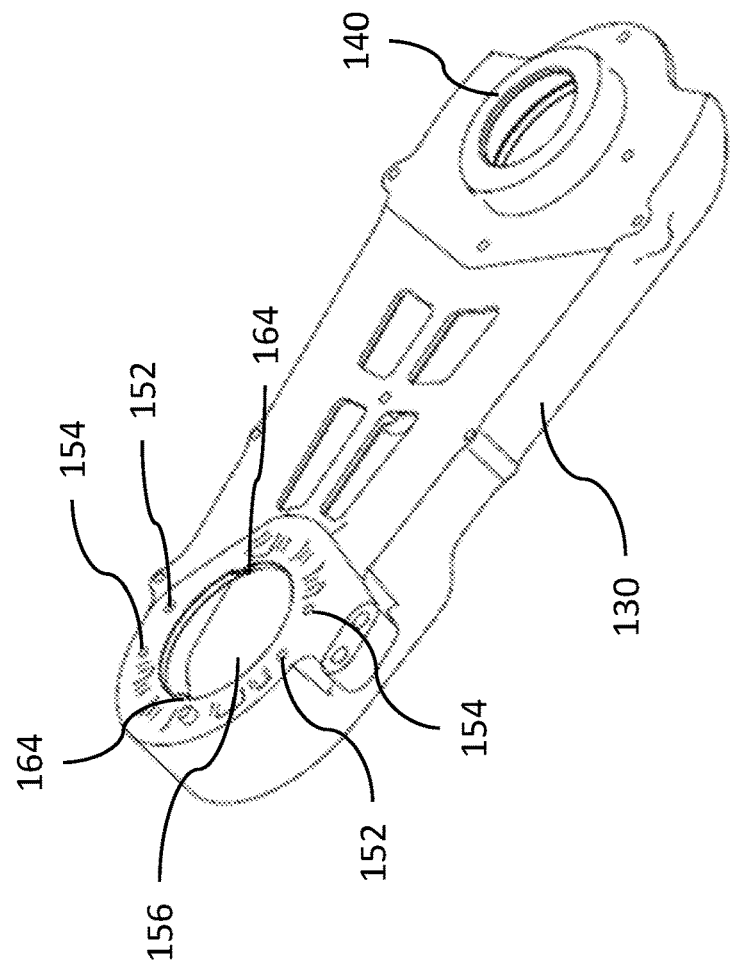
FIG. 20B illustrates a rear perspective view of a shaft positioning arm of the right side of the driveline of the snowmobile, according to some embodiments.
Figure 20A:
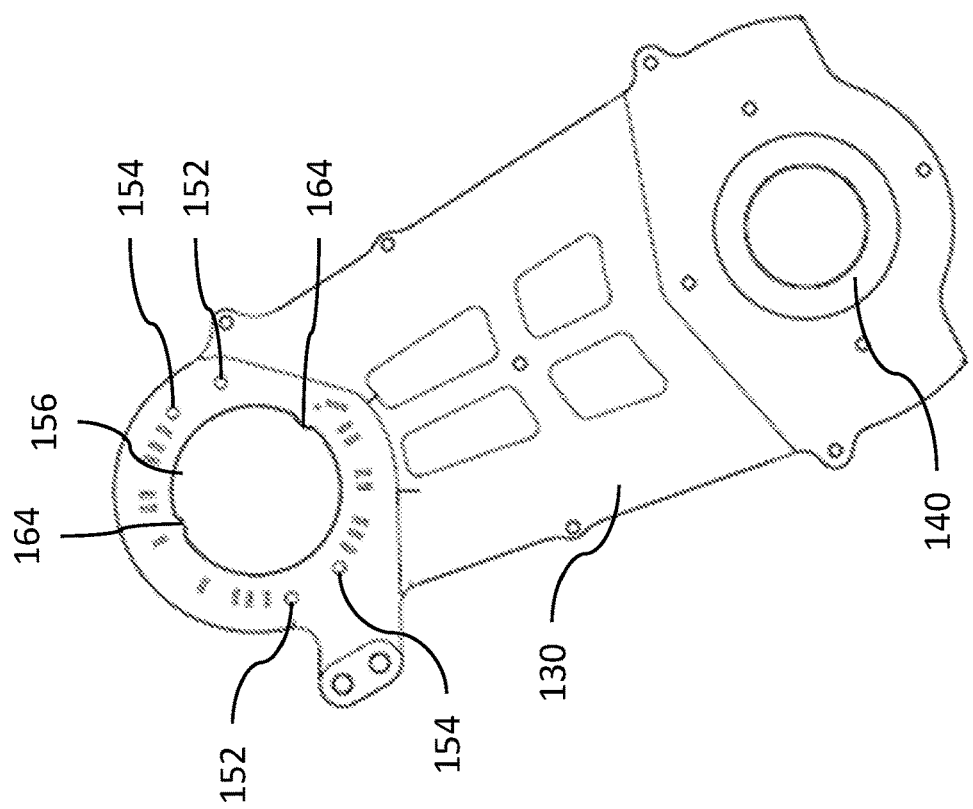
FIG. 20A illustrates a rear view of a shaft positioning arm of the right side of the driveline of the snowmobile, according to some embodiments.

As best shown in FIG. 11, the track drive shaft 128 further includes a track driver sprocket 168 that engages cogs on the inside of the drive track 110 to provide motive power from the track drive shaft 128 to the drive track 110. The track drive shaft 128 also includes a brake disk 170 that interfaces with a brake caliper 172 to stop the track drive shaft 128, thereby stopping the snowmobile 100 by stopping the track drive shaft 128.

The belt housing assembly 130 may be positioned adjacent to a portion of a forward frame assembly and secured thereto. The belt housing assembly 130 may also be secured to the tunnel 104, a heat exchanger assembly 174, or both the tunnel 104 and the heat exchanger assembly 174. As shown in FIGS. 18-20B, the belt housing assembly 130 is attached to a metal plate component of the forward frame assembly 176 and a heat exchanger end cap 178 of the heat exchanger assembly 174 by a plurality of threaded fasteners 186 as shown in FIGS. 17A through 18B. In a non-limiting example, the forward frame assembly may be a component that is preassembled before attaching to one or more of the tunnel 104 and heat exchanger assembly 174. This allows a common forward frame and a common belt housing assembly to be used on different snowmobile models with different features including, but not limited to, track drive shaft locations, steering assembly components, front suspensions and front suspension components, tunnels, and heat exchanger assemblies. The metal plate of the forward frame assembly that the belt housing assembly 130 is secured to may be provided with a plurality of openings for securing the belt housing assembly 130 thereto in more than one position, thereby providing additional flexibility for positioning at least one of the track drive shaft and the jack shaft of one model at a different position with respect to the common forward frame assembly than the track drive shaft or the jack shaft of a different model. The opposite side of the forward frame assembly is provided with a metal plate that is positioned over the opposite side of the tunnel 104 or heat exchanger assembly 174 and is provided with an opening that accommodates different drive track shaft and brake caliper positions for different snowmobiles, based on the desired position of the belt housing assembly 130.

As shown in FIG. 24B, the belt housing assembly 130 includes an integral mounting bracket 180 having multiple mounting holes 182. These mounting holes 182 allow the belt housing assembly 130 to be mounted to the snowmobile 100 at different angles to the jack shaft to accommodate different angular relationships between the jack shaft 126 and the track drive shaft 128 in different snowmobile model configurations.

As best shown in FIG. 24, the belt housing assembly 130 includes a wall 184 that projects outwardly from the belt housing assembly 130 and surrounds the top drive sprocket 132. The wall 184 helps to contain the drive belt in case of a separation failure. The wall 184 may also serve as a heat shield for the drive belt from hot engine or exhaust system components.

The ability to adjust the distance between the jack shaft 126 and the track drive shaft 128 by rotating the eccentric bearing retainer 144 provides the benefits of adjusting tension of the belt 134 interconnecting the top and bottom drive sprockets 132, 136 attached to the jack shaft 126 and the track drive shaft 128 by moving the jack shaft 126 relative to the track drive shaft 128. It also allows removal and installation of the belt 134 on the top and bottom drive sprockets 132, 136 by releasing tension or applying tension on the belt 134 by rotating the eccentric bearing retainer 144. This adjustment ability further allows a common belt housing assembly to be used on different snowmobile designs having different distances between the jack shaft 126 and the track drive shaft 128, e.g., when one snowmobile model has a shorter distance between the jack shaft 126 relative to the track drive shaft 128 than a different snowmobile model.

In alternative embodiments, the belt housing assembly may include an idler sprocket (not shown) to adjust the tension of the drive belt which provides additional belt wrap on the top sprocket and may allow a wider range of upper and lower sprocket diameters to be utilized.

While the belt housing assembly 130 described herein is applied to a snowmobile, other embodiments of this disclosure may be envisioned configured to use for other mechanical power transmission applications in other all-terrain vehicles such as snow bikes, motorcycles, "four wheelers", etc. The belt housing assembly 130 may also be applicable to industrial applications.

FIG. 29 shows a method 200 of adjusting the distance between a first sprocket (bottom drive sprocket 136) attached to a first shaft (track drive shaft 128) of a drivetrain 112 operatively interconnecting the engine 106 of a snowmobile 100 to the drive track 110 via a belt 134 interconnected with a second sprocket (top drive sprocket 132) attached to a second shaft (jack shaft 126) of the drivetrain 112. The track drive shaft 128 has a drive shaft bearing 138 disposed within a fixed bearing retainer 140 in a belt housing assembly 130 and the jack shaft 126 has a jack shaft bearing 142 disposed within an eccentric bearing retainer 144. The method 200 includes the following steps:

STEP 210, ADJUST THE DISTANCE BETWEEN THE FIRST SHAFT AND THE SECOND SHAFT BY ROTATING THE ECCENTRIC BEARING RETAINER, includes adjusting the distance between the track drive shaft 128 and the jack shaft 126 by rotating the eccentric bearing retainer 144;

STEP 212, ADJUST TENSION IN THE DRIVE BELT BY CHANGING THE DISTANCE BETWEEN THE FIRST SPROCKET AND THE SECOND SPROCKET BY ROTATING THE ECCENTRIC BEARING RETAINER, includes adjusting tension in the belt 134 by changing the distance between the bottom drive sprocket 136 and the top drive sprocket 132 by rotating the eccentric bearing retainer 144;

STEP 214, REMOVE THE DRIVE BELT FROM THE FIRST AND SECOND SPROCKETS BY REDUCING THE DISTANCE BETWEEN THE FIRST SPROCKET AND THE SECOND SPROCKET BY ROTATING THE ECCENTRIC BEARING RETAINER, includes removing the belt 134 from the top drive sprocket 132 and the bottom drive sprocket 136 by reducing the distance between the top drive sprocket 132 and the bottom drive sprocket 136 by rotating the eccentric bearing retainer 144 and then slipping the drive belt off the top drive sprocket 132 and the bottom drive sprocket 136. The belt may need be removed in order to replace a worn belt or to replace one of top or bottom drive sprockets 132, 136, see STEP 216 or STEP 218;

STEP 216, REPLACE THE FIRST SPROCKET WITH A THIRD SPROCKET HAVING A DIFFERENT DIAMETER THAN THE FIRST SPROCKET, includes replacing the top drive sprocket 132 with another sprocket having a different diameter than the top drive sprocket 132 in order to change the performance characteristics of the vehicle by altering the ratio between the top drive sprocket 132 and the bottom drive sprocket 136;

STEP 218, ADJUST THE DISTANCE BETWEEN THE FIRST SPROCKET AND THE THIRD SPROCKET BY ROTATING THE ECCENTRIC BEARING RETAINER, includes adjusting the distance between the top drive sprocket 132 with the another sprocket by rotating the eccentric bearing retainer 144;

STEP 220, REPLACE THE SECOND SPROCKET WITH A THIRD SPROCKET HAVING A DIFFERENT DIAMETER THAN THE SECOND SPROCKET, includes replacing the bottom drive sprocket 136 with another sprocket having a different diameter than the bottom drive sprocket 136 in order to change the performance characteristics of the vehicle by altering the ratio between the top drive sprocket 132 and the bottom drive sprocket 136;

STEP 222, ADJUST THE DISTANCE BETWEEN THE FIRST SPROCKET AND THE THIRD SPROCKET BY ROTATING THE ECCENTRIC BEARING RETAINER, includes adjusting the distance between the bottom drive sprocket 136 and the another sprocket by rotating the eccentric bearing retainer;

STEP 224, REPLACE THE DRIVE BELT WITH ANOTHER DRIVE BELT HAVING A DIFFERENT LENGTH, includes replacing the belt 134 with another belt having a different length; and STEP 226, ADJUST THE DISTANCE BETWEEN THE FIRST AND SECOND SPROCKETS BY ROTATING THE ECCENTRIC BEARING RETAINER, includes adjusting the distance between the top drive sprocket 132 and the bottom drive sprocket 136 by rotating the eccentric bearing retainer 144.

As illustrated in the a non-limiting example of FIGS. 30A-32D, the snowmobile 100 may include a forward frame assembly 302 comprising a plurality of tube members. The forward frame assembly 302 may be assembled prior to securing to one or both the tunnel 104 and heat exchanger assembly 174. The forward frame assembly 302 may define a front, a rear, and a longitudinal centerline. The forward frame assembly 302 may include a first side 304 extending substantially along the longitudinal centerline and a second side 306 extending substantially along the longitudinal centerline and spaced apart from the first side 304. Each of the first side 304 and the second side 306 includes an inner perimeter 308 defining a side opening 310. The first side 304 and the second side 306 are positioned to define a rear opening 314 therebetween at the rear of the forward frame assembly 302 for receiving the heat exchanger assembly 174, tunnel 104, or both therein.

According to one or more aspects of the present disclosure, a forward frame assembly 302 for a snowmobile 100 is provided comprising a forward frame 312 including a front, a rear, and a longitudinal centerline. The forward frame 312 includes a first side 304 extending along the longitudinal centerline, a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 therebetween at the rear of the forward frame 312 for receiving a heat exchanger assembly 174 or tunnel 104 therein.

Optionally, the first side 306 defines an outer perimeter 316, the second side defines an outer perimeter 318, and a track drive shaft 128 extends across the forward frame assembly 302. The track drive shaft 128 is positioned rearward of the outer perimeter 316 of the first side 304 and forward of the outer perimeter 318 of the second side 306.

Optionally, the track drive shaft 128 is positioned rearward of the inner perimeter 308 of the first side 304 and rearward of the inner perimeter 308 of the second side 306.

Optionally, the second side 306 comprises a metal plate 320 defining an aperture 322 for receiving the track drive shaft 128 therethrough when the metal plate 320 is positioned to overlap a heat exchanger end cap 178 of the heat exchanger assembly 174 or a side of the tunnel 104.

Optionally, as shown in FIGS. 32B and 32D, the metal plate 320 of the second side 306 defines a first aperture 324 therein for receiving the track drive shaft 128 in a first position or a second position that is different than the first position.

Optionally, the second side 306 includes a rearward leg 326 extending upward and forward from the metal plate 320 to a steering column mount component 328, a forward leg 330 extending upward and rearward to the steering column mount component 328, and a horizontal member 332 substantially extending along the longitudinal centerline from the forward leg 330 to the rearward leg 326. An upper end of the metal plate 320 is shaped to support a rearward end of the horizontal member and is removably secured thereto, and the rearward end of the horizontal member is vertically positioned higher than at least a forward end of the tunnel 104.

Optionally, the first side comprises a metal plate 320 defining an aperture for securing a belt housing assembly 130 thereto when the metal plate 320 is positioned to overlap the heat exchanger end cap 178 of the heat exchanger assembly 174 or a side of the tunnel 104.

Optionally, the metal plate 334 of the first side 304 defines a first aperture therein for securing the belt housing assembly 130 in a first position or a second position that is different than the first position.

Optionally, the first side 304 includes a rearward leg 338 extending upward and forward from the metal plate 334 to a steering column mount component 328, a forward leg 330 extending upward and rearward to the steering column mount component 328, and a horizontal member 342 substantially extending along the longitudinal centerline from the forward leg 330 to the rearward leg 338, and a rearward end of the horizontal member 342 is vertically positioned higher than at least a forward end of the tunnel 104.

Optionally, a jack shaft 126 extends across the forward frame 312 and is positioned beneath the horizontal member 342 of the first side 304.

Optionally, a steering column mount component 328 extends between the first side 304 and the second side 306. The first side 304 and the second side 306 each includes a leg 326, 338 extending upward and forward from the rear of the forward frame 312 to the steering column mount component 328.

Optionally, the steering column mount component 328 includes a first side including a first steering mount and a second side that includes a second steering mount, wherein the second side is positioned rearward of the first side along the longitudinal centerline.

Optionally, the first steering mount 344 is positioned forward along the longitudinal centerline of the forward frame assembly 302 of one or both of the heat exchanger assembly 174 and the tunnel 104.

Optionally, the first side 304 includes a rearward tube 338. The rearward tube 338 include a first end extending upward and forward from the metal sheet 334 to a steering column mount component 328, and a second end extending outward from the first side 304. A running board support 348 is provided that includes a tube with a first end that is mated with the second end of the rearward tube 338 and a second end extending toward a rearward portion of the tunnel 104 or tunnel assembly. The rearward tube 338 of the first side 304 and the tube of the running board support 348 define a continuous tubular length extending from the steering column mount component 328 toward a rearward portion of the tunnel 104 or a side rail.

According to one or more aspects of the present disclosure, a method of assembling a snowmobile 100 is provided comprising providing a preassembled forward frame 312 including a front and rear, the forward frame 312 including a first side 304 and a second side 306. The first and second sides 304, 306 are spaced apart from each other to define a rear opening 314 at the rear of the forward frame 312. At least a portion of a heat exchanger assembly 174, a tunnel 104, or both are positioned in the rear opening 314 between the first side 304 and the second side 306. The preassembled forward frame 312 is then secured to the heat exchanger assembly 174, the tunnel 104, or both.

Optionally, each of the first side 304 and the second side 306 includes an inner perimeter 308 defining a side opening 310.

Optionally, the method includes inserting an engine 106 through the side opening 310 of the second side 306 and securing the engine 106 to the forward frame 312.

According to one or more aspects of the present disclosure, a method of assembling two different snowmobiles with a common forward frame on a common assembly line is provided comprising providing a common forward frame, providing a first rear body component or a second rear body component, securing either the first body component or the second body component to the forward frame, and securing a track drive shaft 128 in a first position with respect to the forward frame when the first body component is secured to the forward frame or securing a track drive shaft 128 in a second position with respect to the forward frame when the second body component is secured to the forward frame, wherein the first position is different than the second position. This provides the benefit of reducing the manufacturing footprint for the assembly and reducing manufacturing costs.

Optionally, the method includes securing a belt housing assembly to the forward frame, the belt housing assembly defining a track drive shaft opening, wherein the track drive shaft opening is located at a first position with respect to the forward frame when the forward frame is secured to the first body component, and wherein the track drive shaft opening is located at a second position with respect to the forward frame when the forward frame is secured to the second body component, wherein the first position is different than the second position.

Optionally, the first body component is a tunnel, a heat exchanger assembly component, or both. Optionally, the second body component is a tunnel, a heat exchanger assembly, or both. Optionally, the first body component is a running board assembly.

According to one or more aspects of the present disclosure, a method of assembling two types of snowmobiles with different drive track requirements is provided comprising providing a common forward frame, providing a first body component with a first drive track requirement and a second body component with a second drive track requirement that is different than the first drive track requirement, wherein at least a first engine mount is provided on one or more of the forward frame, the first body component, and the second body component, positioning either the first body component or the second body component adjacent the forward frame, and securing a belt housing assembly 130 to the first engine mount, the belt housing assembly 130 defining a track drive opening, wherein the track drive opening is located at a first position with respect to the first engine mount when the forward frame is secured to the first body component, and wherein the track drive opening is located at a second position with respect to the first engine mount when the forward frame is secured to the second body component, wherein the first position is different than the second position.

Optionally, the first body component is a tunnel, a heat exchanger assembly, or both. Optionally, the second body component is a tunnel, a heat exchanger assembly, or both.

According to one or more aspects of the present disclosure, a method of assembling two types of snowmobiles with different drive track requirements is provided comprising providing a common forward frame including a front and rear, the forward frame including a first side, and a second side spaced apart from the first side to define a rear opening at the rear of the forward frame. The method includes providing a first body component with a first drive track shaft position and a second body component with a second drive track shaft position that is different than the first drive track position. The method includes positioning either the first body component or the second body component in the rear opening between the first side and the second side, providing a belt drive case that defines a track drive shaft opening, securing the belt housing assembly to the first side of the forward frame, wherein the track drive shaft opening is located at a first position with respect to the first side when the forward frame is secured to the first body component, and wherein the track drive shaft opening is located at a second position with respect to the first side when the forward frame is secured to the second body component, wherein the first position is different than the second position.

Optionally, each of the first side and the second side includes an inner perimeter defining a side opening.

Optionally, the belt housing assembly is secured to the first side for both body components with a jackshaft axis extending through the side openings of the first side and the second side, and a track shaft axis is positioned outside of an outer perimeter of the first side and inside of an outer perimeter of the second side.

Optionally, the method includes inserting an engine through the side opening of the second side and securing the engine to the preassembled frame at a position between the first and second sides.

According to one or more aspects of the present disclosure, a front frame assembly 302 for a snowmobile 100 is provided comprising a forward frame 312 including a front, a rear, and a longitudinal centerline. The frame 312 includes a first side 304 extending along the longitudinal centerline and a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 at the rear of the front frame 312 therebetween for receiving a heat exchanger assembly 174, a tunnel 104, or both therein.

Optionally, the first side 304 defines an outer perimeter 316, and the second side 306 defines an outer perimeter 318. A track drive shaft 128 extends across the forward frame 312 and is positioned rearward of the outer perimeter 316 of the first side 304 and forward of the outer perimeter 318 of the second side 306.

Optionally, the first side 304 defines an inner perimeter 308, the second side 306 defines an inner perimeter 308, and the track drive shaft 128 is positioned rearward of the inner perimeter 308 of the first side 304 and rearward of the inner perimeter 308 of the second side 306.

Optionally, the second side 306 comprises a metal plate 320 defining an aperture 322 for receiving the track drive shaft 128 therethrough when the metal plate 320 is positioned to overlap an end cap 178 of the heat exchanger assembly 174, a side of the tunnel 104, or both.

Optionally, the metal plate 320 of the second side 306 defines a first aperture 324 therein for receiving the track drive shaft 128 in a first position or a second position that is different than the first position.

Optionally, the second side 306 includes a rearward leg or support tube extending (hereinafter referred to as "the rearward leg 326") upward and forward from the metal sheet 320 to a steering column mount component 328, a forward leg or support tube (hereinafter referred to as "the forward leg 330") extending upward and rearward to the steering column mount component 328, and a horizontal member 332 substantially extending along the longitudinal centerline from the forward leg 330 to the rearward leg 326. An upper end of the metal sheet 320 is shaped to support a rearward end of the horizontal member 332 and is removably secured thereto, and the rearward end of the horizontal member 332 is vertically positioned higher than at least a forward end of the tunnel 104.

Optionally, the first side 304 comprises a metal plate 334 defining an aperture for securing a belt housing assembly 130 thereto when the metal plate 334 is positioned to overlap an end cap 178 of the heat exchanger assembly 174, a side of the tunnel 104, or both.

Optionally, the metal sheet 334 of the first side 304 defines a first aperture therein for securing the belt housing assembly 130 in a first position with a fastener, and a second aperture therein for securing the belt housing assembly 130 in a second position with a fastener that is different than the first position.

Optionally, the first side 304 includes a rearward leg 338 extending upward and forward from the metal sheet 334 to a steering column mount component 328, a forward leg 330 extending upward and rearward to the steering column mount component 328, and a horizontal member 342 substantially extending along the longitudinal centerline from the forward leg 330 to the rearward leg 338, and a rearward end of the horizontal member 342 is vertically positioned higher than at least a forward end of the tunnel 104.

Optionally, a jack shaft 126 extends across the forward frame 312 and is positioned beneath the horizontal member 342 of the first side 304.

Optionally, a steering column mount component 328 extends between the first side 304 and the second side 306, wherein the first side 304 and the second side 306 each includes a leg extending upward and forward from the rear of the forward frame to the steering column mount component.

Optionally, the steering column mount component 328 includes a first side including a first steering mount, and a second side that includes a second steering mount, wherein the second side is positioned rearward of the first side along the longitudinal centerline.

Optionally, the first steering mount is positioned forward along the longitudinal centerline of the heat exchanger assembly and the tunnel.

Optionally, the first side 304 includes a rearward tube 338 including a first end extending upward and forward from the metal sheet 334 to a steering column mount component 328, and a second end extending outward from the first side 304, and further comprising a running board support 348 including a tube with a first end that is mated with the second end of the rearward tube 338 and a second end extending toward a rearward portion of the tunnel 104, wherein the tube 338 of the first side and the tube of the running board support 348 define a continuous tubular length extending from the steering column mount component 328 toward the rearward portion of the tunnel 104.

While the disclosed all-terrain vehicle has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:
1. An all-terrain vehicle, comprising:
 a chassis;

an engine;
a ground engagement member; and
a drivetrain operatively interconnecting the engine with the ground engagement member and configured to deliver propulsive power to the ground engagement member, the drivetrain further comprising:
   a bearing housing having a fixed first bearing retainer and an eccentric second bearing retainer,
   a first shaft having a first shaft axis,
   a first bearing disposed within the fixed first bearing retainer and supporting the first shaft,
   a second shaft having a second shaft axis, and
   a second bearing disposed within the eccentric second bearing retainer and supporting the second shaft, wherein the second shaft axis is offset from an axis of rotation of the eccentric bearing retainer and wherein a distance between the first shaft axis and the second shaft axis is adjustable by rotating the eccentric second bearing retainer.

2. The all-terrain vehicle according to claim 1, wherein the first shaft axis is fixed relative to the bearing housing by the fixed first bearing retainer and the second shaft axis is movable relative to the first shaft axis by rotating the eccentric second bearing retainer.

3. The all-terrain vehicle according to claim 2, wherein the eccentric second bearing retainer defines a retainer attachment feature, and the bearing housing defines a first housing attachment feature, wherein a first distance between the first shaft axis and the second shaft axis is established by alignment of the retainer attachment feature with the first housing attachment feature.

4. The all-terrain vehicle according to claim 3, wherein a second distance between the first axis and the second axis that is different from the first distance is established by rotating the eccentric second bearing retainer to align the retainer attachment feature with a second housing attachment feature.

5. The all-terrain vehicle according to claim 4, wherein the alignment of the retainer attachment feature with the first or second housing attachment features is maintained by threaded fasteners engaging the retainer attachment feature and the first or second housing attachment feature.

6. The all-terrain vehicle according to claim 5, wherein the retainer attachment feature is a threaded boss in the eccentric second bearing retainer and wherein the first and second housing attachment features are holes defined in the bearing housing.

7. The all-terrain vehicle according to claim 4, wherein the first housing attachment feature is coaxial with and angularly offset from the second housing attachment feature.

8. The all-terrain vehicle according to claim 3, wherein the eccentric second bearing retainer is rotatably attached to the bearing housing by a cylindrical grooved flange and a tab projecting from the bearing housing projecting into the grooved flange.

9. The all-terrain vehicle according to claim 8, wherein the second bearing is disposed within a cylindrical bearing cavity within the eccentric second bearing retainer and wherein a bearing cavity axis is offset from a grooved flange axis.

10. The all-terrain vehicle according to claim 9, wherein the bearing cavity axis is coaxial with the second shaft axis.

11. The all-terrain vehicle according to claim 1, wherein the first shaft has a first sprocket, and the second shaft has a second sprocket and wherein the first sprocket is interconnected to the second sprocket by a drive belt.

12. The all-terrain vehicle according to claim 11, wherein a circumference around the first sprocket and second sprocket is reduced by rotating the eccentric second bearing retainer, thereby allowing removal of the drive belt from the first and second sprockets.

13. The all-terrain vehicle according to claim 11, wherein tension in the drive belt may be adjusted by rotating the eccentric second bearing retainer.

14. The all-terrain vehicle according to claim 1, wherein the first shaft delivers the propulsive power to the ground engagement member and the second shaft receives the propulsive power from the engine.

15. A method of adjusting a distance between a first sprocket attached to a first shaft of a drivetrain operatively interconnecting an engine to a ground engagement member of an all-terrain vehicle via a drive belt interconnected with a second sprocket attached to a second shaft of the drivetrain, wherein the drivetrain further comprises:
   a bearing housing having a fixed first bearing retainer and a rotatable eccentric second bearing retainer,
   a first shaft having a first shaft axis,
   a first bearing disposed within first bearing retainer and supporting the first shaft,
   a second shaft having a second shaft axis, and
   a second bearing disposed within the eccentric second bearing retainer and supporting the second shaft, wherein the second shaft axis is offset from an axis of rotation of the eccentric bearing retainer, the method comprising:
   adjusting the distance between the first shaft axis and the second shaft axis by rotating the eccentric second bearing retainer, thereby adjusting tension in the drive belt.

16. The method according to claim 15, further comprising:
   removing the drive belt from the first and second sprockets by reducing the distance between the first sprocket and the second sprocket by rotating the eccentric second bearing retainer.

17. The method according to claim 15, further comprising:
   replacing the first sprocket with a third sprocket having a different diameter than the first sprocket; and
   adjusting the distance between the second sprocket and the third sprocket by rotating the eccentric second bearing retainer.

18. The method according to claim 15, further comprising:
   replacing the second sprocket with a third sprocket having a different diameter than the second sprocket; and
   adjusting the distance between the first sprocket and the third sprocket by rotating the eccentric second bearing retainer.

19. The method according to claim 15, further comprising:
   replacing the drive belt with another drive belt having a different length; and
   adjusting the distance between the first and second sprockets by rotating the eccentric second bearing retainer.

20. A belt drive housing assembly of an all-terrain vehicle, comprising:
   a bearing housing having a fixed first bearing retainer and a rotatable eccentric second bearing retainer;
   a first shaft having a first shaft axis;
   a first bearing disposed within first bearing retainer and supporting the first shaft;

a second shaft having a second shaft axis; and a second bearing disposed within the eccentric second bearing retainer and supporting the second shaft, wherein the second shaft axis is offset from an axis of rotation of the eccentric bearing retainer, wherein a distance between the first shaft axis and the second shaft axis is adjustable by rotating the eccentric second bearing retainer from a first position to a second position, and wherein the first shaft is configured to deliver propulsive power from an engine of an all-terrain vehicle to a ground engagement member of the all-terrain vehicle and the second shaft is configured to receive the propulsive power from the engine; and a handle coupled to the eccentric second bearing retainer to move the eccentric second bearing retainer from the first position to the second position.

21. The belt drive housing assembly of claim 20, wherein the bearing housing defines a first opening for receiving the first shaft and a second opening for receiving the second shaft, wherein the second opening is sized to accommodate at least two different positions of the second shaft therein based on the first position and the second position of the second bearing, and wherein the second bearing is selectively movable to move the axis of rotation of the second bearing from the first position to the second position within the second opening.

22. The belt drive housing assembly of claim 21, wherein the second opening of the bearing housing defines an axis, and the axis of rotation of the second bearing is offset from the second opening axis in at least one of the first position and the second position.

23. The belt drive housing assembly of claim 20, wherein the bearing housing comprises an inboard side positionable along at least one element selected from a list consisting of a snowmobile tunnel and a heat exchanger end cap and wherein the handle is positioned on the inboard side of the bearing housing.

* * * * *